US012682415B2

(12) United States Patent
Kakarlapudi et al.

(10) Patent No.: US 12,682,415 B2
(45) Date of Patent: Jul. 14, 2026

(54) GRAPHICS PROCESSING SYSTEMS FOR EXECUTING PROCESSING PIPELINES

(71) Applicant: Arm Limited, Cambridge (GB)

(72) Inventors: Sandeep Kakarlapudi, Trondheim (NO); Frank Klaeboe Langtind, Melhus (NO); Andreas Due Engh-Halstvedt, Trondheim (NO)

(73) Assignee: ARM Limited, Cambridge (GB)

( * ) Notice: Subject to any disclaimer, the term of this patent is extended or adjusted under 35 U.S.C. 154(b) by 132 days.

(21) Appl. No.: 18/613,551

(22) Filed: Mar. 22, 2024

(65) Prior Publication Data

US 2025/0299284 A1     Sep. 25, 2025

(51) Int. Cl.
| | |
|---|---|
| *G06T 1/20* | (2006.01) |
| *G06F 9/50* | (2006.01) |
| *G06T 15/00* | (2011.01) |

(52) U.S. Cl.
CPC .............. G06T 1/20 (2013.01); G06F 9/5016 (2013.01); G06T 15/005 (2013.01)

(58) Field of Classification Search
CPC . G06F 9/5016; G06T 1/20; G06T 1/60; G06T 15/005; G06T 15/80
USPC ................................................ 345/506, 543
See application file for complete search history.

(56) References Cited

U.S. PATENT DOCUMENTS

| | | | |
|---|---|---|---|
| 8,223,158 B1 * | 7/2012 | Lindholm ................. | G06T 1/20 |
| | | | 345/506 |
| 2013/0070760 A1 | 3/2013 | Shah et al. | |
| 2013/0305009 A1 | 11/2013 | Durant et al. | |
| 2019/0012829 A1 | 1/2019 | Engh-Halstvedt et al. | |

OTHER PUBLICATIONS

Search Report under Section 17(6) dated Apr. 8, 2025, GB Patent Application No. GB2408132.5, 2 pages.
Combined Search and Examination Report under Sections 17 and 18(3), dated Nov. 19, 2024, GB Patent Application No. GB2408132. 5, pp. 1-6.

* cited by examiner

*Primary Examiner* — Jacinta M Crawford
(74) *Attorney, Agent, or Firm* — Pearl Cohen Zedek Latzer Baratz LLP

(57) ABSTRACT

A graphics processor that is operable to execute a processing pipeline to generate an output. The graphics processor includes one or more processing circuits that can be configured (and re-configured) to execute a plurality of 'generic' pipeline stages defining at least a part of the processing pipeline. The 'generic' pipeline stages can thus be programmed appropriately to execute the perform the desired pipeline processing operations. A pipeline stage can issue shading requests via a generic shading interface.

20 Claims, 13 Drawing Sheets

800 — Wait for shading response

801 — Response type

FAIL

802 — Mark packet queue item as FAILED and DONE

DONE

803 — Select item from packet queue

804 — Read packet header from memory

805 — Wait for packet header data

806 — Update queue item with packet header data

807 — Mark packet queue item as VALID and DONE

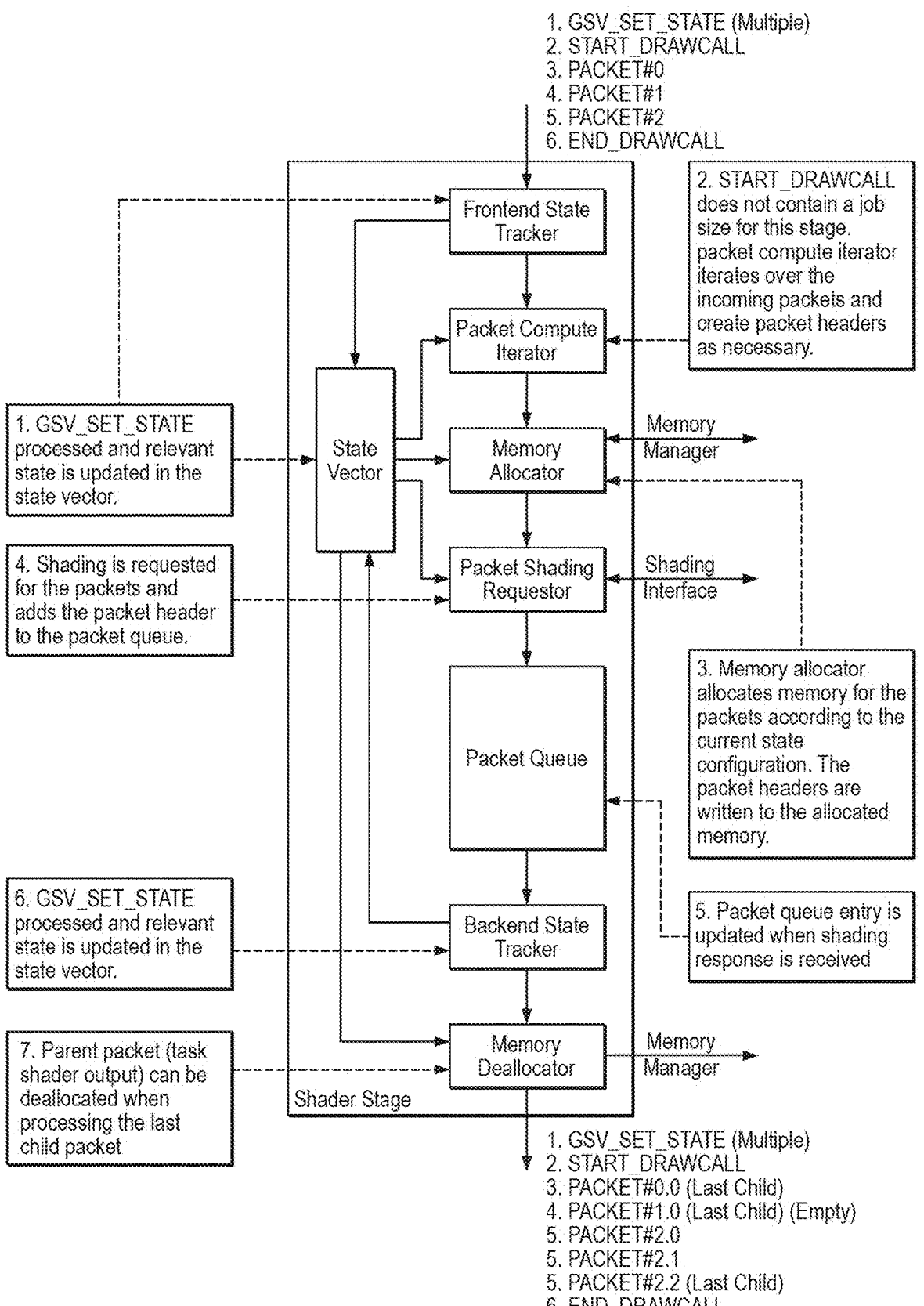

1. GSV_SET_STATE (Multiple)
2. START_DRAWCALL
3. PACKET#0
4. PACKET#1
5. PACKET#2
6. END_DRAWCALL Frontend State Tracker 2. START_DRAWCALL does not contain a job size for this stage. packet compute iterator iterates over the incoming packets and create packet headers as necessary.

Packet Compute Iterator

1. GSV_SET_STATE processed and relevant state is updated in the state vector.

State Vector

Memory Allocator

Memory Manager

4. Shading is requested for the packets and adds the packet header to the packet queue.

Packet Shading Requestor

Shading Interface

Packet Queue

3. Memory allocator allocates memory for the packets according to the current state configuration. The packet headers are written to the allocated memory.

6. GSV_SET_STATE processed and relevant state is updated in the state vector.

Backend State Tracker

5. Packet queue entry is updated when shading response is received

7. Parent packet (task shader output) can be deallocated when processing the last child packet Shader Stage Memory Deallocator Memory Manager 1. GSV_SET_STATE (Multiple)
2. START_DRAWCALL
3. PACKET#0.0 (Last Child)
4. PACKET#1.0 (Last Child) (Empty)
5. PACKET#2.0
5. PACKET#2.1
5. PACKET#2.2 (Last Child)
6. END_DRAWCALL

FIG. 13

GRAPHICS PROCESSING SYSTEMS FOR EXECUTING PROCESSING PIPELINES

BACKGROUND

The technology described herein relates to graphics processing, and graphics processors, and in particular to the operation and configuration of a graphics processor to execute a (graphics) processing pipeline.

Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles.

Each primitive is usually defined by and represented as a set of vertices, where each vertex typically has associated with it a set of "attributes", i.e. a set of data values for the vertex. These attributes will typically include position data and other, non-position data (varyings), e.g. defining colour, light, normal, texture coordinates, etc, for the vertex in question.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and a set of primitives that use those vertices.

Once primitives and their vertices have been generated and defined, they can be processed by the graphics processing system, in order to generate the desired graphics processing output (render target), such as a frame for display. This basically involves rendering the primitives to generate the graphics processing output.

The rendering process uses the vertex attributes associated with the vertices of the primitives that are being processed. To facilitate this operation, the vertices defined for the given graphics processing output (e.g. draw call) are usually subjected to an initial so-called "vertex shading" operation, before the primitives are rendered.

The vertex shading operation typically produces (transformed) vertex positions and one or more outputs explicitly written by the vertex shader. (Attributes output from the vertex shader other than position are usually referred to as "varyings".)

A graphics processing pipeline will typically therefore include one or more vertex shading stages (vertex shader(s)) that execute vertex shading operations, e.g. using the initial vertex attribute values defined for the vertices (and otherwise), so as to generate a desired set of output vertex attributes (i.e. appropriately "shaded" attributes) for use in subsequent pipeline stages of the graphics processing pipeline.

Once the vertex attributes have been shaded, the "shaded" attributes are then used when processing the vertices (and the primitives to which they relate) in the remainder of the graphics processing pipeline.

For example, the "vertex shaded" vertex positions and varyings may be used when rendering the primitives to provide the render output, for example when performing rasterisation and/or fragment shading operations. In the case of a tile-based graphics processing pipeline (where the two-dimensional render output (target) is rendered as a plurality of smaller area sub-regions, usually referred to as "tiles"), the vertex shaded (transformed) positions may be used to sort the primitives relative to the rendering tiles and/or to derive data structures for allowing the primitives to be sorted relative to the rendering tiles.

A vertex shading operation in a graphics processing pipeline will, accordingly, process one or more and typically a plurality of vertices (which can correspondingly be considered to be respective "work items" for the shading operation), to produce a respective "vertex shaded" attribute or attributes for each vertex (work item) that is processed (which attribute or attributes can correspondingly be considered to be respective data elements for the vertex (work item) in question).

Graphics processing pipelines can also include various other (shading) stages that process respective work items and generate a respective data element or elements for each of the work items that they process.

For example, in more advanced geometry processing flows, e.g., where tessellation is enabled, the vertex shading stages described above may be followed by one or more tessellation stages, which tessellation stages typically include a tessellation control shader (TCS) stage (e.g. that determines an amount of tessellation to perform), a tessellation stage that performs the desired tessellation operations (e.g. by executing a tessellation shader and/or using a (fixed-function) tessellation hardware circuit), and a tessellation evaluation shader (TES) (that applies interpolation or other post-processing operations on the tessellated output). More advanced graphics processing flows may also include other stages that perform vertex post-processing such as, but not limited to, a transform feedback stage that captures primitives generated by the vertex processing.

As another example, rather than performing vertex processing (shading) in the manner described above, a graphics processing pipeline may be configured to implement so-called "task" and "mesh" shading stages (shaders). Compared to traditional vertex shading operations, wherein a vertex shader may simply load in a certain number of vertices and then process (i.e. shade) them, a mesh shading stage (mesh shader) is operable to create its own output vertices and primitives.

For instance, a task shading stage (task shader) (also sometimes referred to as an "amplification" shader) can be executed to determine how many child mesh shader workgroups should be launched in a subsequent mesh shading stage (mesh shader). Each mesh shader workgroup can then produce a respective set of output vertices and primitives (i.e. a "meshlet") with all mesh shader workgroups together creating the full output mesh (and so mesh shaders may perform "compute" shader-like processing in which mesh shader workgroups cooperatively generate meshes).

A task shader may also optionally output a payload that is passed to any of its child mesh shader workgroups.

The use of such "task" and "mesh" shaders can at least in some cases thus provide greater flexibility for the application programmer, e.g. compared to graphics processing pipelines that implement more traditional vertex shading operations, as the inputs to and outputs from the "task" and "mesh" shaders can be customised.

Thus, a graphics processor may execute a graphics processing pipeline to support a desired graphics processing flow, and the graphics processor (hardware) may accordingly be configured to support the particular graphics processing pipeline that is desired to be executed by the graphics processor. In this regard, it would be possible to execute any desired graphics processing pipeline in software, e.g. using general purpose compute shader operations. However, this is not normally efficient, and so some level of hardware support is often provided for the graphics processing pipeline, with the pipeline stages typically being specialised to perform certain processing operations for executing a particular graphics processing pipeline.

The Applicants believe, however, that there remains scope for improved arrangements in this regard when a graphics processor is to execute a (graphics) processing pipeline.

BRIEF DESCRIPTION OF THE DRAWINGS

Embodiments of the technology described herein will now be described by way of example only and with reference to the accompanying drawings, in which:

FIG. 11, FIG. 12 and FIG. 13 show an example of the operation of a geometry packet pipeline according to an embodiment.

DETAILED DESCRIPTION

Figure 1:
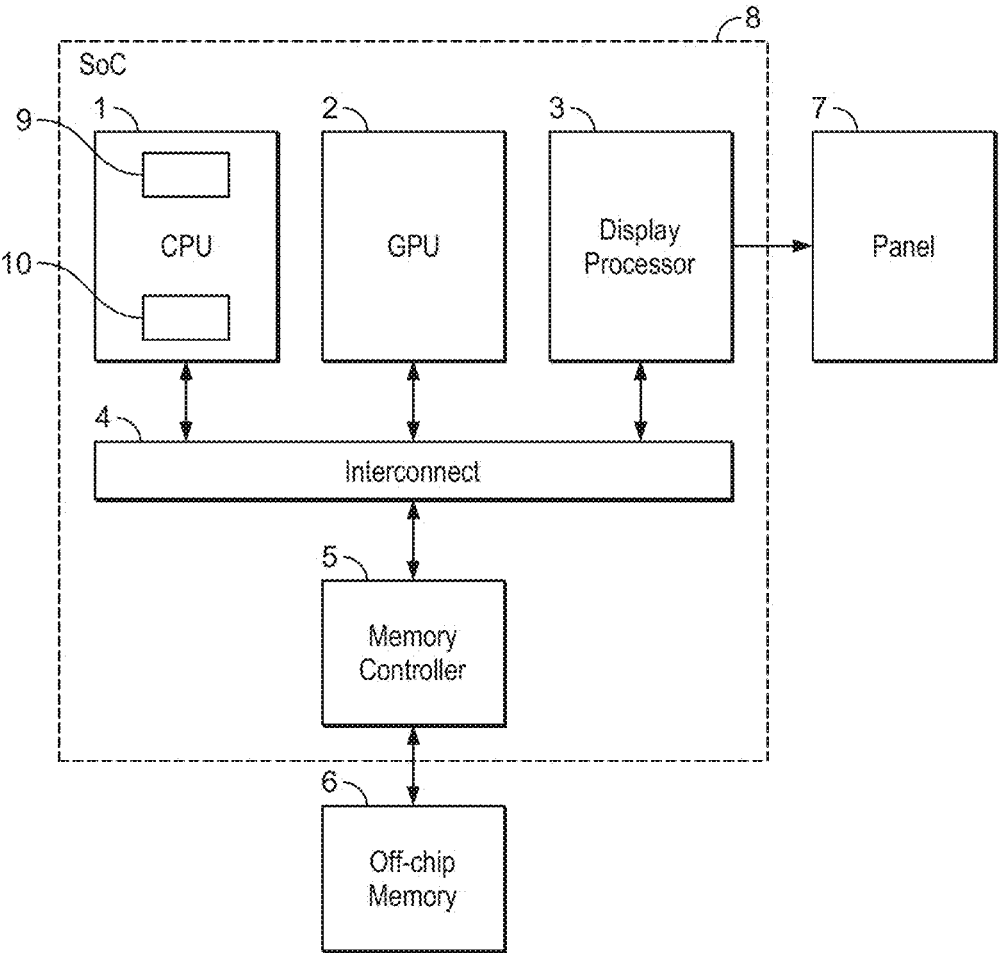
FIG. 1 shows an exemplary data processing system in which the technology described herein may be implemented.

A first embodiment of the technology described herein comprises a graphics processor that is operable to execute a processing pipeline to generate an output, the graphics processor comprising:

a set of one or more shader cores, each shader core including a respective programmable execution unit for executing shader programs; and one or more processing circuits configured to execute a plurality of ('generic') pipeline stages defining at least a part of the processing pipeline, wherein at least one (generic) pipeline stage of the plurality of pipeline stages is operable and configured to:

process an incoming packet of work items to determine from the incoming packet of work items a corresponding zero or more child packets of work items to be further processed within the pipeline stage; and for a child packet of work items to be further processed within the pipeline stage:

allocate, for the child packet of work items, a respective portion of memory; and issue the child packet of work items to the set of shader cores for processing, the set of shader cores processing the packet of work items.

A second embodiment of the technology described herein comprises a method of operating a graphics processor, the graphics processor comprising:

a set of one or more shader cores, each shader core including a respective programmable execution unit for executing shader programs; and one or more processing circuits configured to execute a plurality of (generic) pipeline stages defining at least a part of a processing pipeline, the plurality of pipeline stages including at least a first (generic) pipeline stage and a second (generic) pipeline stage to which packets are passed from the first pipeline stage, the method comprising:

receiving, at the first pipeline stage of the processing pipeline, an incoming packet of work items; and the first pipeline stage processing the incoming packet of items to determine from the incoming packet of work items at least one corresponding child packet of work items to be further processed within the pipeline stage;

the method further comprising:

for each child packet of work items to be further processed within the pipeline stage:

allocating, for the packet of work items, a respective portion of memory;

issuing the packet of work items to the set of shader cores for processing, the set of shader cores processing the packet of work items; and providing the processed packet of work items for output to the second pipeline stage in the processing pipeline.

The technology described herein relates generally to graphics processors and graphics processor operation, and in particular to graphics processors that implement and support a novel and advantageous '(re-) configurable' processing pipeline concept, as will be explained further below.

In particular, the processing pipeline can be, and is, implemented using a set of 'generic' (programmable) pipeline stages that can be configured to map to a corresponding set of desired (different) stages of a (graphics) processing pipeline to be executed. This configuration of the (generic) pipeline stages can thus be, and in an embodiment is, performed in advance of, and for, a particular instance (or number of instances) of processing pipeline execution, e.g. prior to issuing any work to the processing pipeline for the particular instance(s) of graphics processing pipeline execution. The processing pipeline, once configured, can then be executed accordingly to process "packets" of work items to generate an overall pipeline output.

The processing pipeline that can be (and is) executed by a graphics processor according to the technology described herein is thus in an embodiment hardware-implemented (e.g. rather than being executed entirely in software, e.g. using general purpose computer shaders, which may be less efficient), but the processing pipeline (hardware) is in an embodiment configured in software, and can therefore in an embodiment also be re-configured in software, as desired, e.g. for different instances of processing pipeline execution (e.g. between render passes, or even within a render pass (e.g. between draw calls)).

This can then provide a more flexible and configurable approach as the 'generic' pipeline stages can be configured and used to support various different graphics processing flows (including, for example, more advanced geometry processing flows, e.g. utilising task/mesh shaders, tessellation shaders, transform feedback, etc.) and this is in an embodiment done using the same, underlying (generic) pipeline stage hardware (circuitry) but with the pipeline stages triggering different processing (e.g., and in an embodiment, by triggering different (shader) program execution) depending on the particular configuration of the pipeline stages defining the graphics processing pipeline.

For example, a desired graphics processing flow can be suitably mapped onto a graphics processing pipeline, with the pipeline stages (hardware) then being configured and programmed appropriately in advance of one or more instances of processing pipeline execution to support that graphics processing flow. In this way, the same underlying hardware (circuits) may be used to support multiple, different graphics processing flows.

To facilitate this, as mentioned above, the processing pipeline that is executed by the graphics processor according to the technology described herein thus includes a number of 'generic' pipeline stages, wherein each (generic) pipeline stage is operable to process "packets" of work items in a similar fashion, i.e. by performing the same, basic sequence of processing operations, but with different processing being performed by different pipeline stages (e.g., and in particular, by the different pipeline stages invoking different shader programs) as part of those same, basic processing operations based on the type of packet and/or the configuration (state) of the pipeline stage in question for the current instance of processing pipeline execution.

Thus, according to the technology described herein, each (generic) pipeline stage is in an embodiment capable of being operated and configured in common to perform a particular (same) sequence of processing operations in response to an incoming packet of work items (but it will be appreciated that the actual sequence of processing operations performed by a given pipeline stage will depend on the configuration of that pipeline stage and/or the packet to be processed).

For instance, each (generic) pipeline stage in an embodiment comprises a pipeline stage "frontend" (circuit) that is configured to receive incoming packets of work items and control further processing of packets within the pipeline stage.

The pipeline stage "frontend" (circuit) in particular is operable and configured to perform a set of initial processing operations to process incoming packets of work items to determine corresponding sets of packets of work items that are to be further processed within the pipeline stage.

In this respect, it will be appreciated that an incoming packet of work items may be directly passed on for further processing within a pipeline stage, e.g. if it is possible and desired to do so. Thus, at least some packets may pass straight through the pipeline stage "frontend" (circuit).

However, it may often be the case that the further processing that is to be performed within a pipeline stage in respect of a particular incoming (input) packet will output data elements that do not fit into a single (output) packet, in which case a corresponding plurality of "child" packets may need to be, and in an embodiment are, generated from the incoming packet. Thus, at least some packets may be processed to generate corresponding child packets that are to be further processed within the pipeline stage.

It could of course also be the case that an incoming packet does not need to be further processed within the pipeline stage. Thus, at least some packets may be invalidated/deallocated within a pipeline stage.

Thus, the initial processing operations performed by the pipeline stage "frontend" (circuit) in an embodiment determine (e.g. generate) from an incoming packet of work items a corresponding zero or more packets of work items to be further processed within the (remainder of the) pipeline stage.

Depending on the result of these initial processing operations, the remaining packets (if any) will then be processed accordingly. This will depend on the configuration of the pipeline stage and/or the type of packet in question.

However, for at least some pipeline stages, and at least some packets of work items that it is determined should be further processed within a given pipeline stage (whether that be the original packet of work items or, more typically, corresponding "child" packets generated from the original packet of work items), the pipeline stage ("frontend" (circuit)) then allocates a respective portion of memory for (storing data for) that packet.

For these packets, once a respective portion of memory has been allocated for a packet of work items, the pipeline stage ("frontend" (circuit)) then issues the packet of work items via a suitable (generic) shading interface to the graphics processor's set of shader cores for processing. The processing of a packet by the graphics processor's set of shader cores may, and typically will, involve execution by a programmable execution unit of a shader core of a respective shader program or shader programs that are specified to be executed for the pipeline stage in question (with the shader program(s) that is triggered being determined based on the particular configuration of the pipeline stage, such that different pipeline stages can trigger different shader programs). For instance, a pipeline stage that is configured as a vertex shading stage may trigger a vertex shader, whereas a pipeline stage configured as a mesh shading stage may trigger a mesh shader, etc., However, the shader cores may generally perform any suitable and desired processing of work items, depending on the desired pipeline configuration.

As will be explained further below, each pipeline stage should therefore, and in an embodiment does, have a 'generic' shading interface to the set of shader cores over which shading requests can be sent.

After the required packet processing (e.g. shading) has been performed for a given packet of work items, the processed (shaded) output is returned to the pipeline stage that triggered that processing, e.g., and written to the respective portion of memory that was allocated for that packet, and the processed packet of work items can then be (and is) made available for output, e.g. to a next pipeline stage in the graphics processing pipeline (or otherwise, e.g. if the current pipeline stage is the last pipeline stage), and subsequently output from the pipeline stage as appropriate, e.g. for further processing.

For example, in embodiments, as will be explained further below, a, and in an embodiment each, generic pipeline stage is further operable and configured to track the packets that are currently being processed within the pipeline stage. This is in an embodiment done using respective indicators (e.g., and in an embodiment in the form of respective packet headers) identifying packets that are currently being processed within the pipeline stage (and this in an embodiment includes both packets that are queued for shading and packets for which shading has been performed but the packet has not yet been passed on to a next pipeline stage).

Thus, a pipeline stage of the plurality of pipeline stages is in an embodiment operable and configured to store respective identifiers for packets currently being processed within the pipeline stage. The identifiers may be stored in any suitable and desired manner. For example, in embodiments, the pipeline stage is operable and configured to maintain a packet 'buffer' (e.g. queue) for storing the respective identifiers for packets currently being processed within the pipeline stage. However, other arrangements would of course be possible.

Any processed packets can then be, and in an embodiment are, provided for output from such packet buffer (queue) (e.g. to a next pipeline stage of the graphics processing pipeline, or otherwise depending on the pipeline stage in question), with the packets in an embodiment being pushed from the head of the packet queue, e.g., and in an embodiment, so that packets are provided for output in the same order in which they are added to the packet queue (e.g. in a 'first-in-first-out' manner).

In an embodiment, each generic pipeline stage further comprises a pipeline stage "backend" (circuit) that manages the passing of (data for) the processed packets to the next processing stage (which could be a next pipeline stage, or another processing stage, e.g. if the pipeline stage is the last pipeline stage).

For example, the pipeline stage "backend" (circuit) may communicate with a suitable memory management system that is shared between pipeline stages and that can control access by the various pipeline stages to the memory in which (data for) packets can be stored. Thus, after a given pipeline stage allocated a respective portion of memory for a given packet, if (data for) that packet is potentially also required by another, later pipeline stage, access to the memory is in an embodiment controlled by such shared memory management system, as will be described further below.

A packet of work items made available for output by a particular pipeline stage may thus be subsequently pushed from the respective packet buffer (queue) maintained for that pipeline stage to a (i.e. the) next pipeline stage in the processing pipeline, and at least where the next pipeline stage is another 'generic' pipeline stage, the packet of work items may then be processed by the next (generic) pipeline stage in a similar fashion, i.e. by the next pipeline stage first processing the packet to determine corresponding (e.g. "child") packets that are to be processed within the next pipeline stage, and these (child) packets then being further processed (e.g. shaded) appropriately and provided for output to a further next pipeline stage in the processing pipeline, and so on, e.g. until a last stage of the processing pipeline is reached.

Thus, the (generic) pipeline stages within the processing pipeline can be, and are, configured/programmed to perform different processing operations, e.g., and in particular, by triggering different shader programs, such that the (generic) pipeline stages together can be, and are, configured to performed a certain sequence of (pipelined) packet processing operations to generate an output for the graphics processing pipeline. However, the (generic) pipeline stages but may be, and in an embodiment are, at least operable to perform the same basic set of processing operations in response to receiving an incoming packet, i.e. as described above, and so the (generic) pipeline stages can be, and in an embodiment are, implemented using the same, generic hardware circuits/circuitry.

Another aspect of the processing pipeline according to the technology described herein is that the (generic) pipeline stages are operable and configured to process work items at a "packet" granularity, wherein a packet comprises a set of plural work items, but which work items may, e.g., depending on the pipeline stage in question and the processing to be performed for that packet, comprise any suitable and desired set of work items.

For example, in the context of geometry processing, the work items within a packet may comprise any of vertices, meshes, tasks, bounding boxes, primitives, etc., for which processing is to be performed.

Thus, each pipeline stage may be, and in an embodiment is, operable and configured to generate data elements for a set of work items (such as vertex attributes for vertices in the case of a vertex shading stage), and the pipeline stages are operable to process such sets of work items at a "packet" granularity.

The entities that pass through the pipeline stages of the graphics processing pipeline, and for which processing is performed within the pipeline stages of the graphics processing pipeline, thus comprise respective "packets" comprising (data for) plural of the work items (e.g. vertices, etc.) that the respective pipeline stages are generating data for.

Further, as alluded to above, each (generic) pipeline stage may process an incoming (input) packet of work items in various different ways, depending on the type of packet and/or the pipeline stage configuration, such that the packets output by a particular pipeline stage may not, and typically will not, correspond directly to any incoming packet that was input to that particular pipeline stage (but the output packets will instead be "child" packets that are generated from the processing of the incoming "parent" packet wherein the parent packet was output from a previous pipeline stage (and wherein the output child packets may thus in turn be parent packets for corresponding child packets that are generated in a next pipeline stage)).

Various arrangements would be possible in this regard depending on the configuration of the processing pipeline and the particular processing (shading) operations that the different pipeline stages of the processing pipeline are configured to perform.

This packet-based processing can therefore provide increased flexibility/configurability in terms of the processing that may be supported by the graphics processing pipeline according to embodiments of the technology described herein as the inputs/outputs for a particular pipeline stage can be more customised, e.g. since a packet that is input to or output from a given pipeline stage may generally contain any suitable group of work items (which may, e.g., be vertices, but could also be other geometry (or other) data), and these packets can be split, etc., to generate new child packets, as required. Again, therefore, the use of the processing pipeline according to the e technology described herein may further increase flexibility/configurability compared to more traditional graphics processing pipelines, for example, in which each stage may have a stricter format for input data (e.g. a traditional vertex shading stage may require vertex data in a particular format), which may restrict options for the application programmer.

Thus, according to the technology described herein, a processing pipeline is implemented using (at least) a plurality of 'generic' pipeline stages, with these (generic) pipeline stages each being operable to process "packets" of work items in a similar fashion, but configurable to perform different processing operations depending on the particular configuration of the pipeline stage in question.

An effect and benefit of this is in an embodiment then to facilitate more flexible and configurable graphics processor arrangements, e.g. since there may be fewer restrictions on the inputs/outputs to each pipeline stage, and the pipeline stages can be configured to map to, and hence support, various different graphics processing flows, as desired.

For example, in particular embodiments, the processing pipeline is a geometry processing pipeline that processes raw geometry that has been application-defined for a particular graphics processing operation into a suitable, e.g. screen-space, format version of that geometry for subsequent rendering of the geometry to produce a desired output (e.g. an image or other output). However, the geometry processing that is and can be supported in the technology described herein can comprise any suitable and desired sequence of one or more geometry processing stages that may be performed as part of a graphics processing pipeline. In an embodiment, the geometry processing comprises one or more of, and in an embodiment plural of, the following geometry processing stages: a position shader (position shading); a vertex shader (vertex shading); a tessellation control shader (tessellation control shading); a task shader (task shading); a tessellation stage (tessellation shading); a mesh shader (mesh shading); a tessellation evaluation shader (tessellation evaluation shading); a geometry shader (geometry shading); and a transform feedback stage (transform feedback shading). The geometry processing may comprise one or more of these shader stages, as desired, and the (generic) pipeline stages can thus be configured to support various geometry processing flows, e.g., and in particular, by configuring different pipeline stages to trigger different shader programs as desired (and in this respect it is noted also that a particular pipeline stage may be operable to trigger any desired shader program or shader programs, i.e. such that a particular pipeline stage may map to multiple of the geometry processing (shader) stages).

The technology described herein may therefore provide various benefits compared to other possible approaches.

Subject to the particular requirements of the technology described herein, the graphics processor (and processing pipeline) may otherwise be operated and configured in any suitable and desired manner.

For instance, as discussed above, the processing pipeline according to the technology described herein can, and does, include a plurality of 'generic' pipeline stages (and the technology described herein particularly relates to the operation and configuration of these (generic) pipeline stages).

However, subject to this, the overall processing pipeline may generally contain any suitable and desired pipeline stages and so could also, and in some embodiments does, include one or more other (i.e. 'non-generic') pipeline stages, as appropriate, which other pipeline stages may perform any other suitable processing operations, as desired. For example, 'other' pipeline stages might suitably be provided as a first and/or last pipeline stage in the processing pipeline that either provides packets to the (generic) pipeline stages or drains primitives packets therefrom, which might therefore desirably operate in a different manner to the intermediate pipeline stages, and various arrangements would be possible in this regard.

Embodiments relate to tile-based graphics processing including a binning stage that sorts geometry relative to the tiles. In that case, the geometry processing prior to the binning stage operates to generate respective (geometry) packets, each containing data for geometry to be processed. The binning stage then generates a data structure or structures to allow the packets storing data for geometry that apply to respective rendering tiles to be identified.

In such embodiments, the processing pipeline according to the technology described herein may thus perform the geometry processing prior to the binning stage of the tile-based graphics processing flow, and may, for example, process raw geometry that has been application-defined for a particular graphics processing operation into a suitable, e.g. screen-space, format version of that geometry for subsequent rendering of the geometry to produce a desired output (e.g. an image or other output).

The geometry processing generates respective (geometry) packets that each store data for a set of one or more primitives to be processed. In an embodiment the first stage of the geometry processing, which in an embodiment comprises position shading and/or vertex shading (comprising both position shading and varying shading, for example) acts as an "input packetizer" that generates initial packets storing data for sets of one or more primitives to be processed. These initial geometry packets are then in an embodiment appropriately processed by (any) subsequent stages of the geometry processing to generate, for example, modified versions of the initial geometry packets and/or to generate additional geometry packets, as required. For example, a mesh shader may generate multiple packets from a single input packet.

Thus, in some embodiments, the geometry processing pipeline includes an "input packetizer" stage that may be, and in an embodiment is, provided at the start (top) of the graphics processing pipeline, and that is operable to output initial packets storing data for sets of one or more primitives to be processed (and these initial packets are then passed from the "input packetizer" stage to the next pipeline stage for further processing). The processing pipeline may thus include an input packetizer stage that provides input packets for the processing pipeline.

The "input packetizer" stage, where present, may be, and in some embodiments is, a dedicated "input packetizer", i.e. that is different to the 'generic' pipeline stages described above. For example, the "input packetizer" stage could be a dedicated (e.g. hardware) unit that only creates input packets and outputs those packets to a next pipeline stage, without performing any further processing (e.g. shading). Alternatively, the "input packetizer" stage may include a shading interface, for example, the "input packetizer" stage may also be implemented by (a first) one of the 'generic' pipeline stages.

Various arrangements would be possible in this regard.

It will be appreciated that such "input packetizer" stage may not be required for all graphics processing flows. For example, when the geometry processing pipeline includes task/mesh shading stages (so that task/mesh shading is performed rather than traditional vertex shading) a dedicated input packetizer stage (circuit) may not be required since the task/mesh shaders can output their own vertices/primitives. Likewise, such "input packetizer" stage may not be required, when the graphics processing pipeline is supporting general purpose (i.e. non-graphics) processing work.

Therefore, in embodiments, an/the "input packetizer" stage, where present, may be, and in an embodiment is, selectively disabled in such cases.

In this regard, as will be discussed further below, in embodiments, any pipeline stages can be selectively enabled/disabled in use, e.g. based on a desired configuration state of the graphics processing pipeline for a particular processing job (and this re-configuration may be done, e.g., between render passes, or between draw calls within a render pass, etc., as desired).

As discussed above, the processing pipeline according to the technology described herein is implemented at least in part by so-called 'generic' pipeline stages. That is, at least certain sections of the processing pipeline are implemented using such (generic) pipeline stages.

The processing pipeline that is executed according to the technology described herein includes a plurality of such (generic) pipeline stages.

The plurality of (generic) pipeline stages may generally be configured and arranged in various suitable ways.

In an embodiment, however, there is a contiguous sequence of two or more, such as three, four, five or six, connected (generic) pipeline stages within the processing pipeline. Thus, packets output from one generic pipeline stage may be provided as input to a next generic pipeline stage, etc., within such sequence of connected (generic) pipeline stages.

Embodiments of the technology described herein relate particularly to the operation and configuration of these (generic) pipeline stages.

Each (generic) pipeline stage is at least operable in common to perform the basic sequence of processing steps for an incoming packet of work items, e.g. as described above (although they may be, and typically will be, configured to perform different processing operations to execute the desired processing pipeline).

For instance, as mentioned above, the initial processing of an incoming packet of work items to a given one of the (generic) pipeline stages may, and in an embodiment does, determine from the incoming packet of work items a corresponding zero or more (child) packets that are to be processed within that pipeline stage.

There are various options in this regard depending on the overall configuration of the processing pipeline.

For example, in some cases, there may be a one-to-one correspondence between incoming (input) packets and output packets for a particular processing stage. That is, an incoming (input) packet may pass straight through this initial processing, with that packet then being processed (or not) as desired within the pipeline stage.

However, it is (more) often the case that an incoming packet to a given pipeline stage may generate a plurality of "child" packets that are to be processed with, and output from, that pipeline stage, such that in general the number of packets passing along the pipelines stages may be amplified along the graphics processing pipeline. An example of this would be a mesh shader for instance that generates multiple packets from a single input packet. It would also of course be possible for a given pipeline stage to determine that an incoming packet does not need to be further processed within that pipeline stage, in which case the incoming packet is essentially culled (and zero corresponding packets are output).

Thus, according to the technology described herein, incoming packets to a (and each) (generic) pipeline stage are (initially) processed to determine zero or more packets to be further processed within that pipeline stage, with the determined packets then being further processed (shaded, etc.) as desired.

The initial processing of incoming packets can determine this in any suitable and desired way, e.g. based on the type of packet and/or the configuration of the pipeline stage in question.

For example, in embodiments, packets may need to be split into plural "child" packets when dictated by the workgroup (job) size for the shader programs that are specified to be executed for the pipeline stage in question. This may also be the case wherein the data structures used to store packets are configured to store up to (fixed) maximum number of work items, and wherein the processing within a particular pipeline stage involves amplification of work items.

Thus, the determination may, and often will, comprise generating from the incoming (parent) packet a plurality of corresponding "child" packets.

In embodiments, a (and in an embodiment each) packet of work items is associated with metadata, in an embodiment in the form of a packet header, that dictates how many (if any) "child" packets should be generated for that packet. Thus, when an incoming packet is received by a given pipeline stage, the pipeline stage ("frontend" (circuit)) is in an embodiment operable to determine from such metadata, e.g. by reading the packet header, how many (if any) "child" packet workgroups should be invoked for the incoming packet, and then generate a corresponding number of child packets to be processed in the pipeline stage. The packet metadata, e.g. packet header, may thus be updated by the processing within a given pipeline stage (e.g. by the shading operation) so that the updated metadata (packet header) can then be used accordingly by the next pipeline stage. In this respect, it will be appreciated that the processing within a particular pipeline stage may thus configure the (compute) context for the next pipeline stage.

For example, where a particular pipeline stage is configured as a task shading stage (i.e. a task shader), the task shader execution may determine for each task within a task packet that is being processed within the task shading stage (task shader) how many corresponding mesh shader workgroups should be generated and processed within a subsequent mesh shading stage (mesh shader) in response to the mesh shading stage (mesh shader) receiving that task. Based on this, the associated packet metadata (header) can be updated appropriately. When a task packet is passed from the task shading stage (task shader) to the subsequent mesh shading stage (mesh shader), the incoming task packet should thus generate a corresponding number of mesh shader workgroups, and this is in an embodiment controlled by the mesh shading stage (mesh shader) "frontend" reading the associated packet metadata (header) for the incoming (task) packet and using this to generate a suitable number of mesh packets for processing within the mesh shader pipeline stage.

Various other examples would be possible in this regard.

Thus, the packet metadata (headers) may be updated by the pipeline stage processing in order to pass information between pipeline stages. In addition to such packet metadata (included in a packet header), a subsequent pipeline stage when processing a given (child) packet may also need to use the output data that was generated by the processing of a corresponding (parent) packet in an earlier pipeline stage.

Thus, when executing a processing pipeline in which a stage or stages of the pipeline generate data for use by later stage(s) of the pipeline, there may be a need for the data generated by the stage(s) to be stored for subsequent use by other pipeline stage(s), and for those other pipeline stage(s) to be able to access that data appropriately.

For a packet of work items that is to be further processed within the pipeline stage (e.g., and in particular, for each "child" packet generated within the pipeline stage "frontend" (circuit)), the pipeline stage ("frontend" (circuit)) is in an embodiment then operable to allocate, for the packet of work items, a respective portion of memory pool for (temporarily) storing data for that packet.

The memory that is available for storing (data for) packets can generally be any suitable and desired memory and can be configured in various ways. In an embodiment, however, the memory that can be allocated for storing (data for) packets is portioned into a plurality of memory "pools", each memory pool being associated with one or more pipeline stages. This can then help with memory management, in particular managing data dependencies between pipeline stages.

In an embodiment, therefore, a (generic) pipeline stage is associated with at least one memory pool that it is able to allocate portions of for temporarily storing data for packets of work items that are to be processed within that pipeline stage. In embodiments, at least some (generic) pipeline stages are associated with respective memory pools that the respective (generic) pipeline stage is able to allocate portions of for temporarily storing data for packets of work items that are to be processed within that pipeline stage.

In an embodiment, each pipeline stage (including the input packetizer, when present) other than the (final) (primitive) packet draining stage, where this is present, has an associated memory pool from which it can allocate respective portions for temporarily storing data for packets of work items that are to be processed within that pipeline stage.

Various arrangements would be possible in this regard.

A given (generic) pipeline stage may thus allocate respective portions of its memory pool for respective packets that are processed/generated within that pipeline stage. There may, however, then be one or more other, later pipeline stages that also potentially need to access (data for) packets that were generated/processed by an earlier pipeline stage. That is, data generated by a particular, earlier pipeline stage in respect of a packet may also be required as input for the processing of corresponding (child) packets in certain, later pipeline stages. Such later pipeline stages should therefore, and in an embodiment do, also have access to any memory pools storing data that may be needed by such later pipeline stages. Such later pipeline stages can in an embodiment also update the data within such memory pools, but cannot perform new allocations within such memory pools.

That is, in an embodiment, for a particular instance of graphics processing pipeline execution (e.g. for a particular render pass or draw call within a render pass), only a single pipeline stage should be permitted to allocate portions of any given memory pool (and the memory pool is thus associated with that single pipeline stage), but once a portion of a memory pool has been allocated for storing data for a particular packet, other, later pipeline stages that may need that data are in an embodiment also able to access/update (data in) that memory pool as needed.

This memory (pool) assignment is in an embodiment performed in advance during an initial configuration of the processing pipeline. That is, when the processing pipeline is being configured, a set of memory pools are in an embodiment configured, and appropriate access permissions are set for each of the pipeline stages to the respective memory pools. For example, a suitable indicator of which pipeline stages can access which memory pools can be generated during the initial pipeline configuration. This indicator may, e.g., take the form of a 'bit mask' per memory pool indicating which pipeline stages can access that memory pool, but other arrangements would of course be possible.

Thus, the access permissions may be flexibly re-configured for different instances of executing the processing pipeline (e.g. between render passes or draw calls), but should be, and in an embodiment therefore are, fixed for a particular instance (or set of instances) of the processing pipeline.

The first pipeline stage that can access a given memory pool is thus permitted to allocate portions of that memory pool (and it is in an embodiment only the first pipeline stage that is permitted to allocate portions of the memory pool). Any other pipeline stages that are permitted to access the memory pool are thus in an embodiment able to read data from, and in an embodiment also update data within, the memory pool, but are in an embodiment unable to allocate portions of the memory pool (and instead, those pipeline stages may, and typically will, be associated with another, separate memory pool from which they can allocate portions for work items being processed/generated by those pipeline stages).

As mentioned above, there is in an embodiment a shared memory management system that is operable and configured to then manage any accesses to the memory pools by the pipeline stages (and enforce such access permissions).

The memory pools that are available and associated with the different (generic) pipeline stages may reside in any suitable and desired memory accessible by the graphics processor. For instance, in embodiments, the memory pools from which the (generic) pipeline stages are able to allocate respective portions of may be partitioned from within an overall geometry buffer.

Various arrangements are however contemplated in this regard.

The (data generated for) packets of work items being processed by a particular pipeline stage can thus be written to the associated memory pool for that pipeline stage (i.e. the memory pool from which that pipeline stage can allocate respective portions). For example, as mentioned above, for a (child) packet of work items that is to be further processed within a particular pipeline stage, a respective portion of the associated memory pool for that pipeline stage can be temporarily allocated for use by that packet, as required. A suitable packet identifier (e.g. included within a packet header) can thus be written to the allocated portion of the associated memory pool to reserve that portion. Any data (elements) generated for a packet can then be written to the respective portion of the memory pool that has been allocated for that packet during the processing of the packet.

Further, the data (elements) generated for a packet, and stored in a respective portion of a memory pool, can then be read from, and in an embodiment also updated by, subsequent pipeline stages, as needed.

The initial assignment of the memory (pools) to the (generic) pipeline stages, and setting of the relevant access permissions, during the overall pipeline configuration thus controls and facilitates the data flow along the processing pipeline. For example, even when different (logical) pipeline stages share the same underlying physical circuits, different (generic) pipeline stages in an embodiment have respective, different memory pool 'carveouts' from which they can allocate respective portions of for temporarily storing data (elements) generated for packets it is processing (with other pipeline stages potentially being permitted to read/update data from that memory pool, as appropriate based on the pipeline configuration, but being prohibited from allocating portions of that memory pool (and instead having their own associated memory pool from which they can allocate portions for temporarily storing data (elements) generated for packets being processed by those pipeline stages).

After the allocation of a respective portion of memory for a packet for which memory is to be allocated, the pipeline stage ("frontend" (circuit)) then continues processing the packet, in particular by issuing the packet of work items to the graphics processor's set of shader cores for processing (e.g. shading). The set of shader cores in an embodiment then executes a respective shader program (or set of shader programs) that has been specified to be executed for the pipeline stage in question, e.g. based on the particular configuration of the pipeline stage/graphics processing pipeline.

The graphics processor may include any suitable and desired arrangement of shader cores. Thus, the set of shader cores can be any suitable and desired set of shader cores that is operable to execute shader programs.

The set of shader cores may comprise a single shader core but in an embodiment includes plural shader cores. Where there are plural shader cores, each shader core may be operable to execute shader programs in a similar manner. The (and each) shader core should, and in an embodiment does, comprise appropriate circuits (processing circuits/ logic) for performing the operations required of the shader core. Where there are plural shader cores, each shader core may be provided as a separate circuit to other shader cores of the graphics processor, or the shader cores may share some or all of their circuits (circuit elements). Various arrangements would be possible in this regard.

As with the memory (pool) allocations, the configuration of the pipeline stages including the binding of shader programs to pipeline stages is in an embodiment performed during an initial configuration of the processing pipeline. The function of each (generic) pipeline stage, e.g., and in particular, the respective shader program(s), if any, that it can trigger when processing a packet of work items, is thus in an embodiment configured (e.g. programmed) in advance, e.g. based on the overall processing pipeline configuration.

Respective information (e.g. pipeline state) indicating the configuration of a given (generic) pipeline stage can thus be indicated in a suitable data structure that is associated with, or accessible to, the pipeline stage, and this information can be used to control which shader program or programs can be (and are) triggered by that pipeline stage when processing work items. The state information is in an embodiment configured in advance of processing pipeline execution, and the state information can potentially, and in an embodiment, therefore subsequently be updated, as needed, e.g. to reconfigure the respective shader program or programs executed by a particular pipeline stage.

Each (generic) pipeline stage thus in an embodiment has a respective shading interface via which it can submit shading requests to the graphics processor's set of shader cores (with this shading interface also being generic in that a (generic) pipeline stage can issue different types of shading request, as needed, depending on the configuration of the pipeline stage). Such (generic) shading requests may, for example, be issued to a general purpose (e.g. "compute") shader endpoint that is operable to trigger the shader program(s) specified for the different pipeline stages. When a pipeline stage is issuing a shading request to the graphics processor's set of shader cores, the shading request should therefore, and in an embodiment does, also include an indication of which shader program (or programs) are to be executed. The shader program may be indicated relative to a preconfigured 'shader binding table', for example, that includes a list of available shader programs. Various other arrangements would however be possible in this regard.

Thus, in embodiments, each (generic) pipeline stage is operable to send shading requests to the set of shader cores using a generic shading interface, the shading requests including information usable by the set of shader cores to determine the respective shader program or programs to be executed for the pipeline stage in question.

To facilitate this, in embodiments, an indication of the respective shader program or programs specified to be executed for a pipeline stage is stored as state information associated with, or accessible to, the pipeline stage in question, and wherein the pipeline stage when issuing a packet of work items to the graphics processor's set of shader cores for processing is configured to, when issuing a shading request to the graphics processor's set of shader cores, indicate to the graphics processor's set of shader cores the respective shader program or programs to be executed. As mentioned above, this state information is in an embodiment configured in advance of an instance of graphics processing pipeline execution, and can subsequently be updated to reconfigure the respective shader program or programs executed by a particular pipeline stage (for another instance of graphics processing pipeline execution).

Other arrangements would however be possible. For example, once the graphics processing pipeline (and its pipeline stages) has been initially configured, this configuration could be separately provided, or otherwise made available, to the set of shader cores, such that a controller for the shader cores (e.g. the generic/compute shading endpoint that controls the scheduling of tasks to the shader cores) can determine, e.g. based on a suitable identifier for the stage that is issuing the shading request, the shader program or programs to be executed for that pipeline stage.

Thus, when a pipeline stage issues a packet of work items to the set of shader cores for processing (shading), the set of shader cores then executes a respective shader program (or set of shader programs) (if any) that has been specified to be executed for the pipeline stage in question, e.g. based on the particular configuration of the pipeline stage/graphics processing pipeline.

The shading request should also, and in an embodiment does, indicate one or more memory locations containing the (input) packet(s) to be processed and/or for writing the (output) results. It will be appreciated that this is also done 'generically', such that the set of shader cores simply receives indications of (e.g. pointers to) input/output memory locations to be used, and these memory locations can include any desired packets to be processed, but the set of shader cores does not necessarily know which pipeline stages those packets relate to. This can therefore again increase flexibility/configurability of the processing pipeline.

Thus, in embodiments, a shading request issued from a pipeline stage to the set of shader cores also includes an identifier of a memory location for the packet of work items to be processed and optionally one or more further memory locations for other packets of work items that may be used for the processing.

It is believed that the use of this generic shader interface may be novel and advantageous in its own right.

Thus, a further embodiment of the technology described herein comprises a graphics processor that is operable to execute a processing pipeline to generate an output, the graphics processor comprising:

a set of one or more shader cores, each shader core including a respective programmable execution unit for executing shader programs; and one or more processing circuits configured to execute a plurality of pipeline stages defining at least a part of the processing pipeline, wherein at least one pipeline stage of the plurality of pipeline stages is operable and configured to:

issue, via a respective generic shading interface, shading requests to the set of shader cores for processing packets of work items, wherein a shading request that is issued to the set of shader cores in respect of a packet of work items includes information usable by the set of shader cores to determine the respective shader program or programs, if any, to be executed for the pipeline stage in question and an identifier of a memory location for the packet of work items to be processed.

A yet further embodiment of the technology described herein comprises a method of operating a graphics processor to execute a processing pipeline to generate an output, the graphics processor comprising:

a set of one or more shader cores, each shader core including a respective programmable execution unit for executing shader programs; and one or more processing circuits configured to execute a plurality of pipeline stages defining at least a part of the processing pipeline, the method comprising:

when a pipeline stage of the plurality of pipeline stages is processing a packet of items for which shading is to be performed:

the pipeline stage issuing, via a respective generic shading interface, a shading request to the set of shader cores for processing the packet of work items, the shading request including information usable by the set of shader cores to determine the respective shader program or programs, if any, to be executed for the pipeline stage in question and an identifier of a memory location for the packet of work items to be processed.

The set of shader cores then executes the specified shader program (or programs) and returns the (shaded) output data to the pipeline stage. The (shaded) output data is in an embodiment thus written to the respective portion of the memory pool for the pipeline stage that has been allocated for the work item for question.

Once the packets have been processed (shaded), and the respective output data is available, the processed packets of work items are then provided for output as appropriate (e.g. to a next pipeline stage in the graphics processing pipeline, or otherwise).

To facilitate this, as mentioned above, each (generic) pipeline stage in an embodiment maintains a respective "packet" buffer (e.g. queue) that can be used to store respective indicators for the packets that are (currently) being processed within the pipeline stage (i.e. packets that have not yet been passed on to a next pipeline stage in the graphics processing pipeline).

Packets could be added to the buffer (queue) only when the required packet shading has been performed. In an embodiment, however, at least when memory allocation is performed, packets are added to the buffer (queue) at the point of memory allocation (along with a suitable indicator that the required packet shading has not yet been performed). Thus, in an embodiment, when an incoming packet is received for processing, for each (e.g. child) packet that it is determined should be processed further within the pipeline stage, a respective portion of the pipeline stage's memory pool is in an embodiment allocated for that packet, and a suitable identifier for the packet is added to the packet buffer (queue). The identifier for the packet is in an embodiment a packet header that identifies the packet in question and can also indicate various other state, as desired.

So long as the required packet shading has been performed, packets are then pushed out from the packet buffer (queue), e.g. to a next (pipeline) stage for processing.

For example, for pipeline stages other than the last pipeline stage, packets may be, and in an embodiment will be, pushed out from the packet buffer (queue) to another pipeline stage. The next pipeline stage (to which packets are passed) is in an embodiment operable and configured to receive a packet identifier from the head of the packet queue from the preceding pipeline stage, and this incoming packet is then processed accordingly by the next pipeline stage. In an embodiment, packets are passed to the next pipeline stage in the (same) order in which they are generated for processing (although the actual processing (shading) may complete out of order). Thus, in embodiments, the packet buffer (queue) operates in a 'first-in-first-out' (FIFO) manner to enforce a desired packet ordering between pipeline stages.

Various other arrangements would of course be possible in this regard.

The next pipeline stage (to which packets are passed) is in an embodiment then operable and configured to read packet identifiers from the head of the packet queue from the preceding pipeline stage and, so long as the required packet shading has been performed, the packet is then pushed to the next pipeline stage for processing.

Thus, according to the operations described above, a given (generic) pipeline stage is operable to issue packets for shading, and maintain a packet queue from which the processed packets can then be read out from, and hence pushed to a next processing stage.

Data for the packet can also be used (and potentially updated) by the next pipeline stage, as required.

This data flow is in an embodiment facilitated, as discussed above, by each (generic) pipeline stage being able to allocate portions of a respective memory pool for temporarily storing (data for) packets of work items that are generated by that pipeline stage, and subsequent pipeline stages then being able to access/update the data in that memory pool, as appropriate, with the pipeline stage's access permissions to respective memory pools being controlled by a suitable shared memory management system, e.g. as described above.

When a packet is passed to the next pipeline stage, the next pipeline stage can thus read the packet identifier (e.g. header) from the packet queue of the preceding pipeline stage. The next pipeline stage can potentially also read data stored for that packet in a memory pool that was allocated by the previous pipeline stage, if needed, with this memory access being controlled appropriately based on the graphics processing pipeline configuration.

It will be appreciated from the above that respective portions of the memory pool associated with a (generic) pipeline stage may be, and is, temporarily allocated for packets of work items during use.

At some point, however, the data for a particular packet will no longer be needed, and so the respective portion of the memory pool allocated for that packet can, and therefore should, be deallocated at that point, e.g. to free up that portion of the memory pool for subsequent packets that are being passed along the graphics processing pipeline.

Thus, once a packet of work items has been fully processed, the allocated memory should therefore eventually be deallocated, e.g. to allow it to be re-allocated for subsequent packets. Thus, in embodiments, after the initial allocation of a respective portion of a memory pool for a packet of work items, the respective (allocated) portion of the memory pool is in an embodiment subsequently deallocated.

In this regard, however, as mentioned above, the Applicants recognise that subsequent pipeline stages may also require the data stored for a particular packet. For example, as described above, subsequent pipeline stages may perform processing for child (or grandchild, etc.) packets corresponding to a particular (parent) packet that is stored in an earlier pipeline stage.

Thus, a mechanism is in an embodiment provided to track which pipeline stages potentially require access to which memory pools and to deallocate a respective portion of a memory pool that has been allocated for a packet only when it is possible (and safe) to do so, i.e. only once all pipeline stages that can potentially access that memory pool have finished their processing of any corresponding (child, grandchild, etc.) packets that might require access to the data for the packet.

The technology described herein therefore in an embodiment also provides a mechanism for suitably invalidating packets when it is possible (and safe) to do so, e.g. so that their allocated memory regions can be deallocated.

This deallocation could be triggered by the last (i.e. final) of the graphics processing pipeline. For instance, once all children, grandchildren, etc., packets of a particular parent packet have been drained from the last graphics processing pipeline stage, the parent packet is no longer required, and so can be invalidated. This can accordingly be signalled via the shared memory management system to the pipeline stage that originally allocated a respective portion of its associated memory pool for storing data for that packet to cause that portion to be deallocated (i.e. and/or to allow the pipeline stage to re-allocate that portion).

The deallocation could also/alternatively be triggered within or by an earlier pipeline stage (i.e. a pipeline stage other than the last pipeline stage), and in embodiments this is what is done. For instance, as described above, as part of the initial pipeline configuration, a suitable indicator of which pipeline stages can access which memory pools is in an embodiment generated, in an embodiment in the form of a respective 'bit mask' per memory pool. Thus, it can be determined from such indicator (e.g. based on which bits are set), which pipeline stages (other than the pipeline stage that performed the initial memory allocation) may access data within a particular memory pool. There will therefore be a last pipeline stage that may access data within a particular memory pool (and this may be the last (i.e. final) stage of the graphics processing pipeline but could also be an earlier, intermediate pipeline stage). Thus, once all corresponding (child, grandchild, etc.) packets of the packet in question have passed through the last pipeline stage that may access data within the particular memory pool storing data for that packet, that packet can be (safely) invalidated, and its respective portion of the memory pool deallocated accordingly.

For instance, packet metadata (e.g. included in the packet header) may be used to indicate whether a packet is the last corresponding (child, grandchild, etc.) packet generated from a particular (parent) packet. This can then be used together with the indication of which pipeline stages may require access to the data stored for that particular (parent) packet to trigger the memory allocation.

Thus, when it is determined that a packet can be invalidated, e.g. when the last corresponding (child, grandchild, etc.) packet that may need data stored for a particular (parent) packet is being passed out of the last pipeline stage that may access that data, the "backend" (circuit) of the last stage in an embodiment triggers a deallocation of the respective memory pool portion that was previously allocated for the particular (parent) packet in question. Other arrangements would however be possible. For example, the deallocation could in principle be triggered by the "frontend" circuit of the stage that follows such last stage, if desired. In some cases, a memory pool may only be accessible by a single stage in which case the memory deallocation can be triggered immediately once that stage has finished its processing.

Whilst described above in relation to the allocation/deallocation of memory pools, it will be appreciated that similar de-allocation can be performed for any memory allocations, i.e. regardless of how the memory is configured.

Thus, in embodiments, the graphics processor is further operable and configured to:

after a respective portion of memory (which may, e.g., be, and in an embodiment is a respective portion of a memory pool, but other arrangements would be possible) has been allocated by a pipeline stage for storing data for a particular, first packet of work items:

determine whether there are any further packets of work items yet to be processed within any subsequent pipeline stages in the graphics processing pipeline for which the processing of the further packets of work items potentially uses the data stored for the particular, first packet of work items; and when it is determined that there are no further packets of work items yet to be processed within any subsequent pipeline stages in the graphics processing pipeline for which the processing of the further packets of work items potentially uses the data stored for the particular, first packet of work items:

deallocate the respective portion of memory that was allocated for storing data for the particular, first packet of work items.

For example, as described above, the determination that there are no further packets of work items yet to be processed within any subsequent pipeline stages in the graphics processing pipeline for which the processing of the further packets of work items uses the data stored for the particular, first packet of work items in an embodiment comprises determining that a last corresponding (child, grandchild, etc.) packet that has been generated from the particular, first packet of work items has being provided for output from a last pipeline stage that may potentially use the data stored for the particular, first packet of work items.

This could be determined based on knowledge of the graphics processing pipeline configuration, in which case it may be known which pipeline stages potentially need packets (data) from which, earlier pipeline stages, e.g. as described above, to ensure that the particular, first packet of work items is invalidated only when it is possible (and safe) to do so.

The actual memory (pool) portion deallocation may be performed in any suitable and desired manner, e.g. using any suitable and desired memory management (deallocation) techniques.

For instance, as mentioned above, this is in an embodiment done by the "backend" (circuit) of the pipeline stage that determines that there are no further packets of work items yet to be processed within any subsequent pipeline stages in the processing pipeline for which the processing of the further packets of work items uses the data stored for the particular, first packet of work items (i.e. that determines that the memory allocated for the first packet of work items can be deallocated) messaging the shared memory management system to signal this.

Thus, each (generic) pipeline stage in an embodiment also has an interface to a shared memory management system that is operable and configured to manage the respective memory (pool) allocations for each of the pipeline stages, and it is this shared memory management system that in an embodiment controls the memory allocation/deallocation process.

Various arrangements would however be possible in this regard.

This packet invalidation/memory allocation may thus facilitate continued packet throughput as portions of memory can be temporarily allocated and then reallocated as needed as and when further packets of work items need respective portions of that memory to be allocated for their processing.

The processing pipeline that is executed according to the technology described herein thus performs a sequence of processing operations to generate an output, at least some of which processing operations are implemented using 'generic' pipeline stages, as discussed above.

The last (i.e. final) stage of the processing pipeline may be any suitable and desired output stage, e.g. depending on the graphics processing operations being performed.

For example, in some embodiments, the processing pipeline is a geometry processing pipeline for a tile-based graphics processing system, and in that case the geometry processing pipeline may feed into a tiling unit that sorts the processed geometry relative to the rendering tiles for which the tile-based graphics processing is being performed (that is, the geometry processing pipeline may feed the tiling pipeline).

Other arrangements would however be possible and the last (i.e. final) stage of the processing pipeline may generally comprise any suitable and desired stage that suitably drains output data from the graphics processing pipeline (e.g. and in an embodiment writes the output data, for subsequent use (e.g. for subsequent rendering/fragment processing)).

Thus, in embodiments, the processing pipeline may include, or may feed, a (final) (primitive) packet draining stage that drains output packets from the processing pipeline, but this (final) (primitive) packet draining stage may generally comprise any suitable and desired stage that is operable to drain output (primitive) packets from the processing pipeline. For example, in the context of geometry processing, the (final) (primitive) packet draining stage may be operable to perform one or more primitive assembly and/or binning operations for (primitive) packets output by the processing pipeline (e.g. as mentioned above).

Various arrangements would however be possible in this regard.

The output data from the processing pipeline may thus be subject to any suitable and desired further processing to generate the overall graphics processor output (whatever that may be).

The processing pipeline according to the technology described herein thus includes a plurality of pipeline stages and these may be configured to perform various different processing operations. Thus, the processing pipeline includes a plurality of different pipeline stages, at least when viewed from a logical perspective. The pipeline stages may, however, and in some embodiments do, share at least some physical circuitry (hardware). For example, as discussed above, at least some of the pipeline stages can be, and are, implemented as 'generic' pipeline stages. This then facilitates using the same physical circuitry (hardware) to implement such pipeline stages. Thus, the plurality of pipeline stages may be, and in an embodiment are, implemented at least in part using the same hardware circuitry, but different ones of the pipeline stages are kept logically separate to each other, for example, by different ones of the pipeline stages being operable to allocate portions of memory from different associated memory pools, as discussed above.

Thus, in embodiments, the number of logical pipeline stages may be, and in an embodiment is, greater than the number of hardware circuits that implement those pipeline stages (for example, in an embodiment, the different (generic) pipeline stages may all be implemented using the same physical circuitry (hardware), with the different (logical) pipeline stages being configured/controlled in software).

As alluded to above, a benefit and effect of the technology described herein is that the processing pipeline (stages) can be configured/programmed in advance to support different graphics processing flows.

Thus, in an embodiment, there is an initial (software) configuration process which is in an embodiment performed per render pass, and which initial configuration process configures the overall processing pipeline. This initial configuration process may include, for example, configuring memory for the processing pipeline and binding respective memory (buffers) to the different pipeline stages, configuring the pipeline stages and binding shader programs to the pipeline stages, etc., and any other pipeline configuration that may desirably be performed at the render pass level.

Once the processing pipeline has been initially configured in this way, processing work can thus be issued to the processing pipeline.

It may also be possible to update/re-configure the processing pipeline more frequently, e.g. between draw calls, by passing state changes through the processing pipeline. These state changes can thus be, and in an embodiment are, passed through the pipeline stages, and can be used to locally update certain pipeline stage configuration (state), as desired. For example, these state changes may be used to selectively enable/disable certain pipeline stages between draw calls, but can also be used to set/update state parameters for the processing operations (shader programs) that will be performed in respect of the different pipeline stages.

Various arrangements would be possible in this regard.

The above describes the main elements and operation of the graphics processor and processing pipeline that are relevant to operation in the manner of the technology described herein.

The technology described herein can be used for all forms of output that a graphics processor and processing pipeline may be used to generate. In particular, the technology described herein may be used both for generating graphics processing outputs, such as frames for display, render to texture outputs, etc., or for general purpose (non-graphics) outputs.

As will be appreciated by those skilled in the art, the graphics processor can otherwise include and execute, and in an embodiment does include and execute, any one or one or more, and in an embodiment all, of the pipeline stages and circuits that graphics processors and processing pipelines may (normally) include.

Thus, for example, the graphics processor may execute a processing pipeline that includes one or more geometry pipeline stages, such as vertex shading, task shading, mesh shading, tessellation shading, etc., and execute one or more rendering stages, such as rasterisation and fragment shading stages, and/or appropriate ray tracing stages. In an embodiment the graphics processor is in the form of a tile-based graphics processor and so also includes and executes an appropriate tiling/binning stage or stages.

Correspondingly, the graphics processor may include any one or more of, and in an embodiment plural of: one or more geometry processing circuits, primitive assembly circuit or circuits, a tiling/binning circuit or circuits, a primitive setup circuit, a rasteriser circuit and a renderer circuit (in an embodiment in the form of or including a programmable fragment shader), a depth (or depth and stencil) tester, a blender, a tile buffer, a write out circuit, etc.

In an embodiment, the graphics processor comprises, and/or is in communication with a memory system, one or more memories, and/or memory devices that store the data described herein, and/or that store software for performing the processes described herein. The graphics processor may also be in communication with a host microprocessor, and/or with a display for displaying images based on the output of the graphics processor.

The output to be generated may comprise any output that can and is to be generated by the graphics processor and processing pipeline. Thus it may comprise, for example, a tile to be generated in a tile based graphics processing system, and/or a frame of output fragment data. The technology described herein can be used for all forms of output that a graphics processor and processing pipeline may be used to generate, such as frames for display, render-to-texture outputs, etc., In an embodiment, the output is an output frame, and in an embodiment an image. However, in general the graphics processors (and processing pipelines) of the technology described herein may be used both for performing graphics processing work, such as generating frames for display, etc., or for performing general purpose (non-graphics) work, as desired.

In an embodiment, the various functions of the technology described herein are carried out on a single graphics processing platform that generates and outputs the (rendered) data that is, e.g., written to a frame buffer for a display device.

The various functions of the technology described herein can be carried out in any desired and suitable manner. For example, unless otherwise indicated, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are configured to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various pipeline stages may share processing circuitry/circuits, etc., if desired.

Furthermore, unless otherwise indicated, any one or more or all of the pipeline stages of the technology described herein may be embodied as pipeline stage circuits, e.g., in the form of one or more fixed-function units (hardware) (processing circuits), and/or in the form of programmable processing circuits that can be programmed to perform the desired operation. Equally, any one or more of the pipeline stages and pipeline stage circuitry of the technology described herein may be provided as a separate circuit element to any one or more of the other pipeline stages or pipeline stage circuits, and/or any one or more or all of the pipeline stages and pipeline stage circuits may be at least partially formed of shared processing circuits.

Subject to any hardware necessary to carry out the specific functions discussed above, the graphics processor can otherwise include any one or more or all of the usual functional units, etc., that graphics processors include.

It will also be appreciated by those skilled in the art that all of the described embodiments of the technology described herein can, and, in an embodiment, do, include, as appropriate, any one or more or all of the features described herein.

The methods in accordance with the technology described herein may be implemented at least partially using software e.g. computer programs. It will thus be seen that the technology described herein may provide computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus, in a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

Embodiments of the technology described herein will now be described.

FIG. 1 shows an exemplary system on chip (SoC) graphics processing system 8 that comprises a host processor comprising a central processing unit (CPU) 1, a graphics processor (GPU) 2, a display processor 3, and a memory controller 5. As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 9 such as a game, executing on one or more host processors (CPUs) 1 will, for example, require the display of frames on the display panel 7. To do this, the application will submit appropriate commands and data to a driver 10 for the graphics processor 2, e.g. that is executing on a CPU 1. The driver 10 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

In the present embodiment, the graphics processor 2 executes a graphics processing pipeline that processes graphics primitives, such as triangles, when generating an output, such as an image for display.

Figure 2:
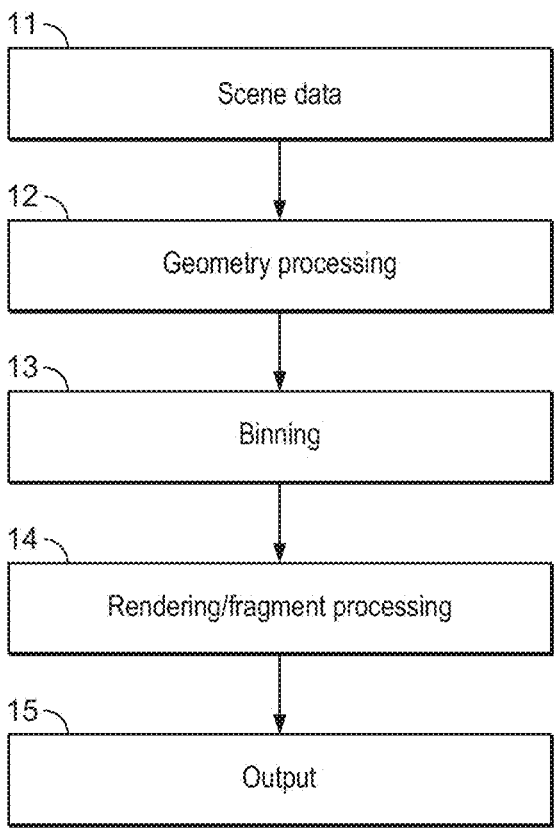
FIG. 2 shows an exemplary graphics processing pipeline.

FIG. 2 shows schematically the processing sequence of the graphics processing pipeline executed by the graphics processor 2 when generating an output in the present embodiments.

FIG. 2 shows the main elements and pipeline stages. As will be appreciated by those skilled in the art there may be other elements of the graphics processor and processing pipeline that are not illustrated in FIG. 2. It should also be noted here that FIG. 2 is only schematic, and that, for example, in practice the shown pipeline stages may share significant hardware circuits, even though they are shown schematically as separate stages in FIG. 2. It will also be appreciated that each of the stages, elements and units, etc., of the processing pipeline as shown in FIG. 2 may, unless otherwise indicated, be implemented as desired and will accordingly comprise, e.g., appropriate circuitry, circuits and/or processing logic, etc., for performing the necessary operation and functions.

As shown in FIG. 2, for an output to be generated, a set of, e.g. scene data 11, including, for example, and inter alia, a set of vertices (with each vertex having one or more attributes, such as positions, colours, etc., associated with it), a set of indices referencing the vertices in the set of vertices, and primitive configuration information indicating how the vertex indices are to be assembled into primitives for processing when generating the output, is provided to the graphics processor, for example, and in an embodiment, by storing it in the memory 6 from where it can then be read by the graphics processor 2.

This scene data may be provided by the application (and/or the driver in response to commands from the application) that requires the output to be generated, and may, for example, comprise the complete set of vertices, indices, etc., for the output in question, or, e.g., respective different sets of vertices, sets of indices, etc., e.g. for respective draw calls to be processed for the output in question. Other arrangements would, of course, be possible.

There is then a geometry pipeline stage or stages 12, which performs appropriate geometry processing of and for the scene data to generate the data that will then be required for rendering the output. This geometry processing 12 can comprise any suitable and desired geometry processing that may be performed as part of a graphics processing pipeline.

In the present embodiments, this geometry processing comprises at least performing vertex processing (vertex shading) of attributes for vertices to be used for primitives for the render output being generated. In particular, appropriate vertex position shading is performed to transform the positions for the vertices from the, e.g. "model" space in which they are initially defined, to the, e.g., "screen", space that the output is being generated in. In embodiments, the vertex shading also comprises generating and/or processing other, non-position attributes of vertices (varyings/varying shading). It would also be possible for some or all the varying shading to be deferred from the geometry processing and, for example, to be triggered at the binning or rendering stages instead, if desired.

As well as appropriate vertex shading, the geometry processing may comprise any other form of geometry processing that is desired, such as one or more of tessellation shading, transform feedback shading, mesh shading, or task shading. This geometry shading may also generate and/or process attributes for vertices, and/or it may process and generate attributes for primitives as well.

Once the desired geometry processing has been performed, there is then, in the present embodiments, as shown in FIG. 2, a binning/tiling stage 13. (It is assumed in this regard that the graphics processor 2 in the present embodiments is a tile-based graphics processor and so generates respective output tiles of an overall output (e.g. frame) to be generated separately to each other, with the set of tiles for the overall output then being appropriately combined to provide the final, overall output.)

The binning process operates to generate appropriate data structures for determining which primitives need to be processed for respective rendering tiles of the output being generated. For example, it may sort the primitives into appropriate primitive lists, which indicate the primitives to be processed for respective tiles or sets of tiles. Alternatively, it may generate other data structures, such as hierarchies of bounding boxes, that can then be used at the rendering/fragment pipeline stage to identify those primitives that need to be processed for a respective tile.

The binning/tiling process 13 may also cull primitives that are not visible (e.g. that fall outside the view frustum, and/or based on the facing direction of the primitives).

As part of the geometry processing and/or the binning/tiling operation the primitives to be processed will be "assembled". The primitives will, as discussed above, be assembled from a set of indices referencing vertices in a set of vertices for the render output processing being performed, based on primitive configuration information indicating how the vertex indices are to be assembled into primitives for processing when generating the render output.

Such primitive assembly may be performed as part of and at an appropriate stage of the geometry processing and/or as part of the binning/tiling processing, as desired. There may also, if desired, be two (or more) "primitive assembly" operations. For example, an initial primitive assembly operation could be performed to identify those vertices that will actually be used for the render output being generated before performing any vertex shading of the vertices, but with there then being a later primitive assembly stage that provides a sequence of assembled primitives for the binning/tiling stage.

Once the binning/tiling process has generated the necessary data structures for identifying the primitives to be processed for respective tiles of the render output, the primitives can then be and are then subjected to appropriate rendering/fragment processing 14. This operation is performed in the present embodiments on a tile-by-tile basis, using the data structures generated by the tiling/binning process 13 to identify those primitives that need to be processed for a respective tile.

The rendering/fragment processing can comprise any suitable and desired rendering and fragment processing operations that may be performed. Thus it may comprise, for example, first rasterising primitives to be processed for a tile to fragments, and then processing those fragments accordingly (e.g., and in an embodiment, by performing appropriate fragment shading of the fragments). The rendering/fragment processing may also or instead comprise performing ray tracing operations, such as performing the rendering by tracing rays for respective fragments representing respective sets of one or more sampling positions of the output being generated. Hybrid ray tracing operations would also be possible, if desired.

The output of the rendering/fragment processing (the rendered fragments) is written to a tile buffer (not shown). Once the processing for the tile in question has been completed, then the tile will be written to an output data array in memory 6, and the next tile processed, and so on, until the complete output data array 15 has been generated. The process will then move on to the next output data array (e.g. frame), and so on.

The output data array may typically be an image for a frame intended for display on a display device, such as a screen or printer, but may also, for example, comprise intermediate render data intended for use in later rendering passes (also known as a "render to texture" output), or for deferred rendering, or for hybrid ray tracing, etc.

Figure 3:
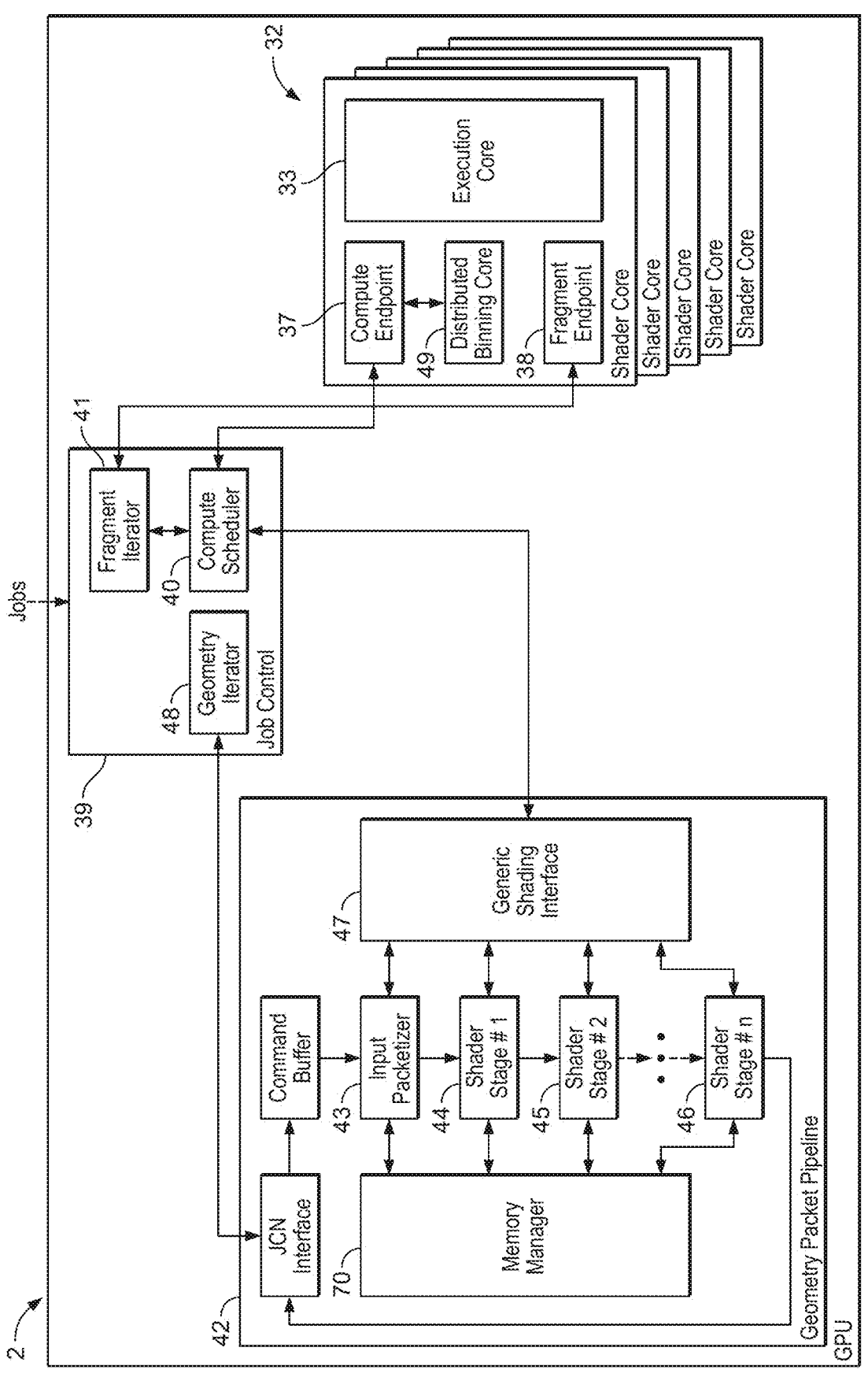
FIG. 3 shows schematically a graphics processor that may be operated in accordance with the technology described herein.

FIG. 3 shows an embodiment of a graphics processor (GPU) 2 that can execute a graphics processing pipeline of the form shown in FIG. 2, and that can be operated in the manner of the technology described herein.

As shown in FIG. 3, the graphics processor 2 comprises a plurality of processing (shader) cores 32 which are each operable to execute (shader) programs to perform processing operations. As shown in FIG. 3 each shader core 32 to facilitate this comprises a programmable execution unit (execution core) 33 that is operable to execute program instructions to perform processing operations.

Each execution core 33 has appropriate access to a memory system 6 of the data processing system that the graphics processor 2 is part of via a pair of hardware-controlled buffers 35, 36.

In the present embodiments, the shader cores 32 are operable to execute both "compute" shader programs (to perform so-called compute shading) and fragment shader operations. Thus as shown in FIG. 3, each shader core 32 comprises an appropriate compute endpoint 37 and fragment endpoint 38 that act as the control interface for performing compute shading and fragment processing, respectively, and that will, for example, and in an embodiment, trigger the execution core 33 to execute the appropriate compute shading or fragment shading tasks, as required.

As shown in FIG. 3, the compute endpoint 37 and fragment endpoint 38 receive appropriate processing tasks from a job control unit 39 of the graphics processor 2, which job control unit 39 includes an appropriate compute scheduler 40 and fragment iterator 41 for distributing processing jobs that the job controller 39 receives as appropriate processing jobs to the shader cores 32.

As discussed above, when performing graphics processing, there will typically be an initial geometry processing pipeline stage determines the vertex and other data that is necessary for generating the graphics processing output in question, which will then be followed by a rendering/fragment pipeline for processing (rendering) that geometry.

In the present embodiments, the geometry processing is performed, as shown in FIG. 3, by a geometry packet pipeline 42 of the graphics processor 2. This geometry packet pipeline is operable to trigger the performance of one or more "geometry" shader stages (which shader stages themselves will be executed by the shader cores 32, under the control of the geometry packet pipeline 42).

For example, as shown in FIG. 3, the geometry packet pipeline 42 comprises an input packetizer 43 that can trigger position shading and vertex shading 50 by the shader cores 32. It also includes further shader stage circuits 44, 45, 46 that are operable to trigger compute shaders 5 for performing geometry processing, such as task shaders, mesh shaders, tessellation shaders, etc., (which again will be executed by the shader cores 32).

As shown in FIG. 3, the geometry packet pipeline 42 has an appropriate interface 47 to the compute scheduler 40 of the job control unit 39, via which it can control and trigger the performance of appropriate geometry shading operations by the shader cores 32.

The overall operation of the geometry packet pipeline 42 is controlled by the job control unit 39 (by a geometry iterator 48 of the job control unit 39) which distributes the appropriate geometry processing jobs and tasks to the geometry packet pipeline 42.

The graphics processor 2 of FIG. 3 is configured to perform rendering in a tile-based manner (as discussed above). To facilitate this, as shown in FIG. 3, each shader core 32 also includes a distributed binning core 49 that is operable to generate appropriate data structures for determining which primitives need to be processed for respective rendering tiles of the output being generated.

In the present embodiments, the distributed binning cores 49 generate hierarchies of bounding boxes for primitives and primitive packets (that contain primitives to be rendered) (which are then used at the rendering/fragment pipeline stage to identify those primitives that need to be processed for a respective tile).

The distributed binning cores 49 may also cull primitives that are not visible (e.g. that fall outside the view frustum, and/or based on the facing direction of the primitives).

The distributed binning cores 49 can operate in any suitable and desired manner for this purpose.

As shown in FIG. 3, the distributed binning cores 49 of the shader cores 32 may trigger vertex shading, such as varying shading, as part of their operation (e.g. where varying shading was not performed by the input packetizer as part of the input packetizer 43 operation).

In the present embodiments, the rendering/fragment processing is performed by executing appropriate fragment processing operations on a shader core 32 under the control of the fragment frontend 38. To facilitate this, as shown in FIG. 3, the fragment endpoint 38 of each shader core is operable to trigger appropriate fragment shader operation by a shader core.

As will be appreciated from the above, in operation of the present embodiments, the geometry packet pipeline 42 that performs the geometry processing will generate appropriate geometry data, such as (transformed) vertex positions, vertex varyings, and primitive attributes (which data can be respectively considered to be corresponding data elements (e.g. positions or varyings, in the case of vertices) for corresponding work items (e.g. vertices)), which data will then be used, for example, by the binning/tiling processing and rendering/fragment processing of the later stages of the graphics processing pipeline.

In the present embodiments, the geometry packet pipeline 42 operates to generate respective geometry packets containing the data that it generates. In the present embodiments, those geometry packets are then processed by the distributed binning cores 49 to generate corresponding primitive packets, which primitive packets are then used by the fragment processing (fragment shaders).

Thus, in the present embodiments, the geometry packet pipeline 42 will generate work item packets, in the form of geometry packets, that store data elements (attributes) for work items (such as vertices and primitives), which geometry packets will then be read and used by the distributed binning cores 49. Correspondingly, the distributed binning cores 49 will generate appropriate primitive packets storing data elements (attributes) for work items, such as vertices and primitives, which primitive packets will then be read and used by the fragment processing 38.

Various other arrangements would of course be possible. For example, rather than the geometry packet pipeline 42 generating geometry packets that are then read and used by the distributed binning cores 49 as shown in FIG. 3, the geometry packet pipeline 42 could interface and provide geometry packets to a tiling unit 59 that then performs more traditional tiling operations, e.g. in the normal (serialized) manner for tile-based graphics processing, using the geometry packets. An example of this is shown schematically in FIG. 4.

Figure 5:
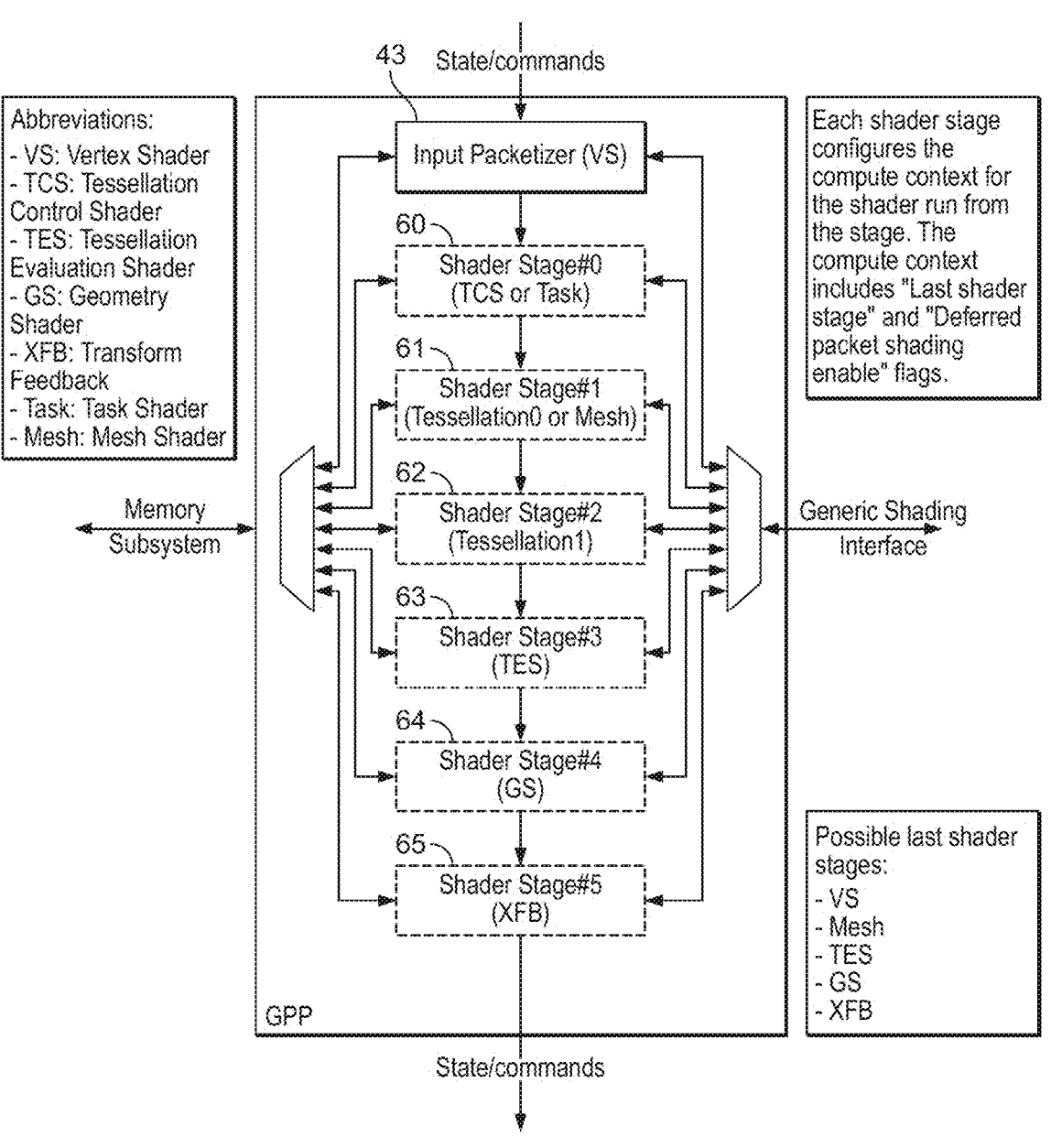
FIG. 5 shows an example of a geometry packet pipeline that may be executed according to an embodiment.

FIG. 5 shows an example of a geometry packet pipeline 42 that may be executed according to the present embodiments in more detail.

As shown in FIG. 5 in the present embodiments, the geometry packet pipeline 42 comprises (can trigger the execution of) six shader stages, an input packetizer 43 (can trigger vertex shading (VS)) a next shader stage 60 that can trigger tessellation control shading or task shading, a next shader stage 61 that can trigger tessellation shading or mesh shading, a next shader stage 62 that can trigger further tessellation shading, a next stage or stage 63 that can trigger tessellation evaluation shading, a next stage or stage 64 that can trigger geometry shading, and a final shader stage 65, that can trigger transformed feedback shading.

In operation, each shader stage of the geometry packet pipeline 42 will configure the compute context for the shader that is run from the stage in question.

In the present embodiments, as will be explained further below, when executing the geometry packet pipeline for a render output (e.g. for a draw call), the various shader stages shown in FIG. 5 can be selectively enabled. In other words, not every execution of the geometry packet pipeline 42 will include all the shader stages shown in FIG. 5, but selective shader stages can be omitted from the geometry packet pipeline 42 that is being executed.

Figure 4:
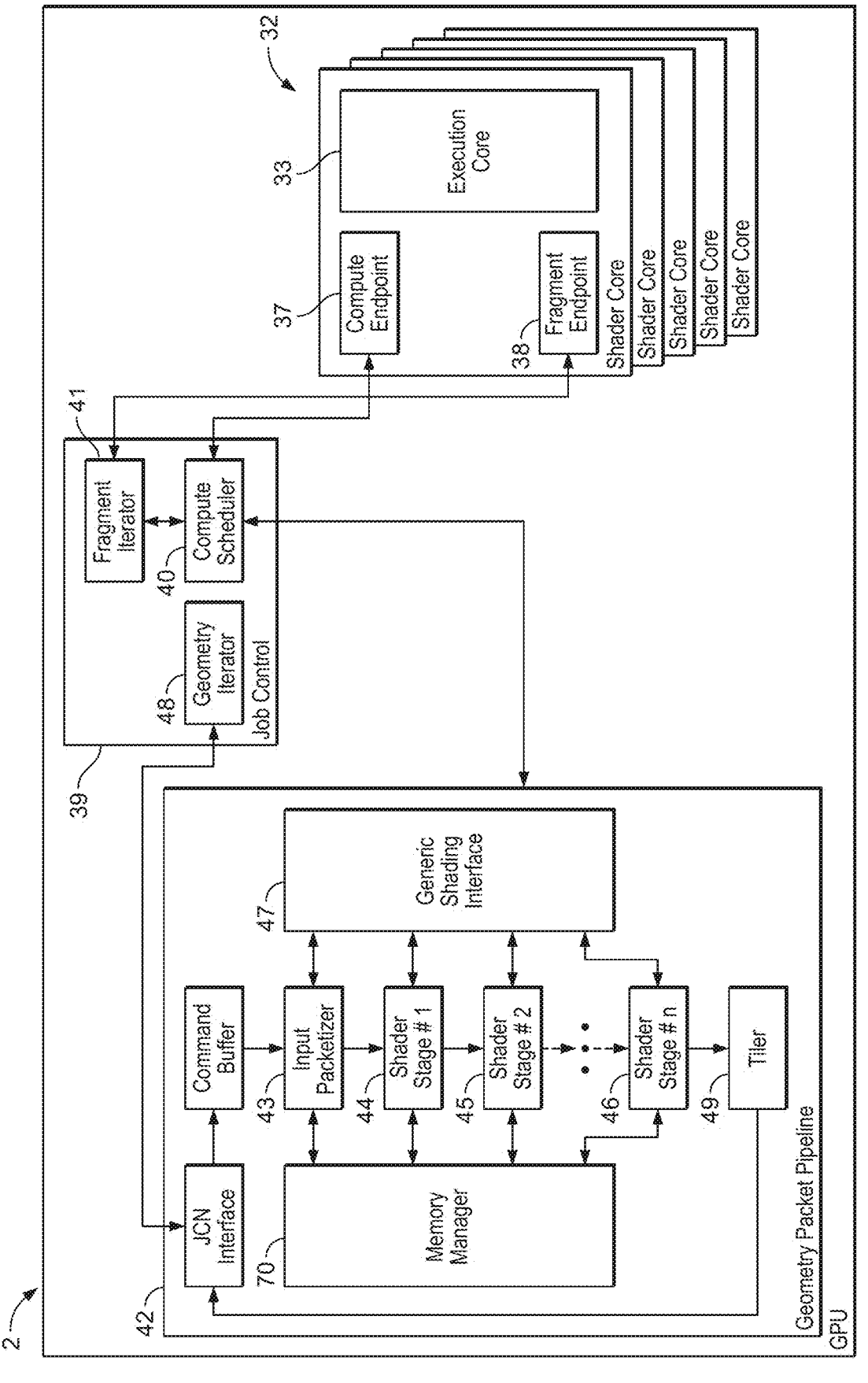
FIG. 4 shows schematically another graphics processor that may be operated in accordance with the technology described herein.

Thus, the geometry processing pipeline 42 may comprise multiple pipeline stages of different types, namely an input packetizer 43, one or more shader stages 60-61-62-63-64-65 that can be implemented using generic shader stage circuits 44, 45, 46, and optionally a packet primitive drain unit (e.g. implemented as part of a tiler unit 59 as shown in FIG. 4).

As mentioned above, the input packetizer 43 reads the index array and builds packets that can be used by the rest of the pipeline. Thus, in the present embodiments, the only shading that can be (and is) invoked by the input packetizer 43 is vertex shading (which can be position-only vertex shading or combined position and varyings shading). The input packetizer 43 can also be selectively disabled and/or enabled without shading and populated with (pre-shaded) input vertices. Various arrangements would be possible in this regard depending on the particular processing operations to be performed.

Once a packet has been fully populated by the input packetizer 43 (when this is done), the packet is sent to the next stage in the geometry processing pipeline 42 which then processes the incoming packet, and performs any desired shading, e.g. as described above. Thus, as described above, the geometry processing pipeline 42 further includes a plurality of shader stages 60-61-62-63-64-65 that are implemented using generic shader stage circuits 44, 45, 46 that can be, and are, dynamically configured in advance of geometry processing pipeline 42 execution as respective shader stages to perform the desired pipeline operations.

Figure 6:
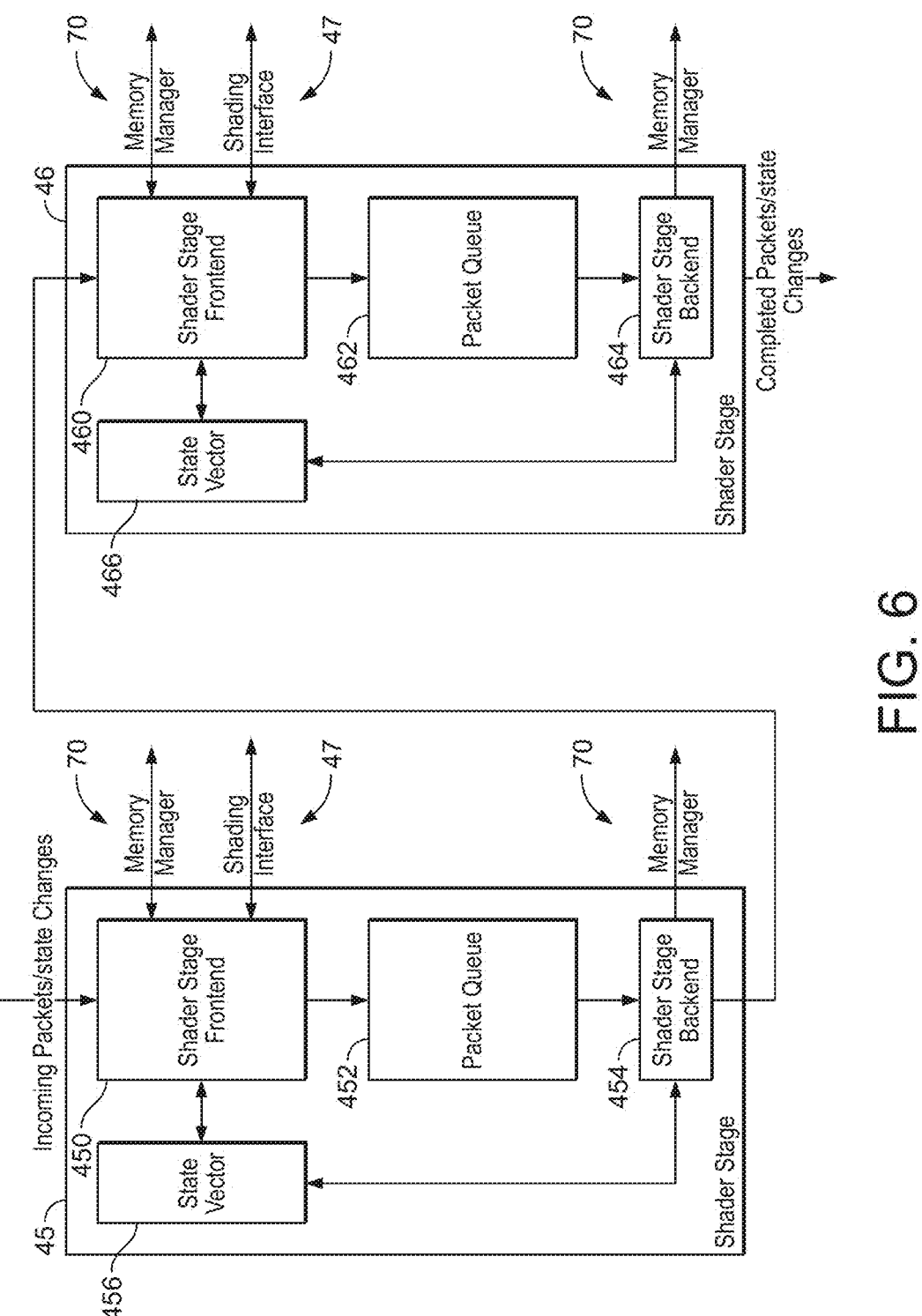
FIG. 6 shows in more detail a generic shader stage circuit within the graphics processing pipeline according to an embodiment.

FIG. 6 shows in more detail the shader stage circuits 44, 45, 46 of the geometry packet pipeline 42. In particular, FIG. 6 shows two of the shader stage circuits 44, 45, 46 connected together to illustrate how data can flow along the geometry packet pipeline 42 through a shader stage circuit and onto the next shader stage circuit.

As shown in FIG. 6, the shader stage circuits 44, 45, 46 are operable to receive (either from the input packetizer 43 or from a previous shader stage circuit in the geometry packet pipeline 42) incoming packets/state changes to be processed. The incoming packets/stage changes are then processed within a shader stage frontend circuit 450, 460 that, as will be explained further below, interfaces and communicates with a memory manager 70 and generic shading interface 47 of the geometry packet pipeline 42. The shader stage frontend circuit 450, 460 is operable to output packets into a respective packet queue 452, 462 that is maintained by each shader stage circuit 44, 45, 46 and packets can be processed from the respective packet queue 452, 462 by a shader stage backend circuit 454, 464 that as shown (e.g.) in FIG. 5 is operable and configured to pass packets on to the next shader stage circuit within the geometry packet pipeline 42.

Packets/state changes can thus be passed through the shader stage circuits 44, 45, 46 and onto the next the shader stage circuits 44, 45, 46, and so on, until they have reached the end of the geometry packet pipeline 42.

As shown in FIG. 6, each shader stage circuit 44, 45, 46 may be, and in the presents embodiments is, 'generic', i.e. in that it is generally operable to perform the same underlying basic processing operations (but with the different shader stage circuits 44, 45, 46 being configured to perform different processing operations to execute the different shader stages). This then means that the shader stage circuits 44, 45, 46 may be implemented generically in hardware with the different processing operations being controlled based on suitable software configuration of the shader stage circuits 44, 45, 46 based on the overall (desired) configuration of the geometry packet pipeline 42.

Thus, as will be explained further below, there may be an initial configuration of the geometry packet pipeline 42 in which the respective shader stage circuits 44, 45, 46 are configured to perform the desired processing operations (and this initial configuration may be performed in advance, e.g. per render pass). Subsequent state changes may also be passed down the geometry packet pipeline 42 to update/set state as needed, e.g. between draw calls.

As shown in FIG. 6, each shader stage circuit 44, 45, 46 may thus have access to a local copy of a state vector 456, 466 that stores configuration state for the shader stage circuit in question, including, for example, an indication of the type of shading requests that are to be triggered by that shader stage circuit.

This can therefore provide a more flexible approach for supporting different types of shader operations as required.

In this respect, it will be appreciated that although the various shader stage circuits 44, 45, 46 are depicted as separate stages, and at least from a logical perspective are treated as separate stages defining the geometry packet pipeline 42, the shader stage circuits 44, 45, 46 may and in some embodiments do share physical hardware circuitry. That is, in general, there may be, and typically will be, fewer physical stages implemented in hardware than there are logical stages within the geometry packet pipeline 42, with the same hardware being configured/re-configured to implement different logical stages, as desired. In an embodiment, there are at least two separate, physical circuits available to implement the different pipeline stages (to allow some parallelisation/overlap of pipeline stages), but in principle there could only be a single physical circuit that is used to support all of the pipeline stages, with the data flow between pipeline stages being managed appropriately, e.g. based on the memory pool allocations, etc.

The geometry processing pipeline 42 may also include at the end of the geometry processing pipeline 42 a suitable packet draining unit that drains the fully processed packets from the geometry processing pipeline 42.

For example, as shown in FIG. 4, the geometry processing pipeline 42 may interface with, and connected to, a tiling unit 59 that pulls fully processed packets from memory, writes fully processed packets to on-chip payload storage, drains the packet, and assembles primitives from the processed packets. The tiling unit 59 may perform visibility culling of the primitives, but any visible primitives can then be (and are) drained in order from the packet and sent on to the tiler pipeline (not shown). The Tiler pipeline may then perform bounding box culling and binning of the primitives and outputs vertex data and polygon lists necessary for the fragment shading, e.g. in the normal manner for such tiling operations.

Alternatively, as shown in FIG. 3, and described above, the draining of packets may be performed by the distributed binning cores 49.

Various arrangements would be possible in this regard for draining fully processed packets from the geometry processing pipeline 42.

When work is to be performed using the geometry packet pipeline 42, this is in an embodiment triggered by executing a suitable instruction (e.g. a 'RUN_PIPELINE' instruction, as will be explained further below), and execution of such instruction causes work to be launched on the first enabled stage in the geometry processing pipeline 42. This first stage may be the input packetizer 43 or a subsequent shader stage depending on the particular operations to be performed (e.g., and in particular, whether the input packetizer 43 is present/enabled).

The first stage requests from the memory manager 70 to allocate a packet in a respective memory pool tied to the first stage. If allocation succeeds, the first stage then issues a shading request via its generic shading interface 47 in respect of the packet to the compute scheduler 40 within the job control unit 39 of the graphics processor 2, which compute scheduler 40 then schedules a corresponding one or more processing tasks to respective compute endpoints 37 of the shader cores 32. The shader program run on the packets issued by a particular stage is in the present embodiments defined by a unique shader program descriptor for the stage, which is configured as part of the initial pipeline configuration.

Consecutive packets issued for shading are thus distributed to available shader cores 32 in this way with the packet shading being controlled via the compute shader scheduler 40 (and compute endpoints 37).

Figure 7:
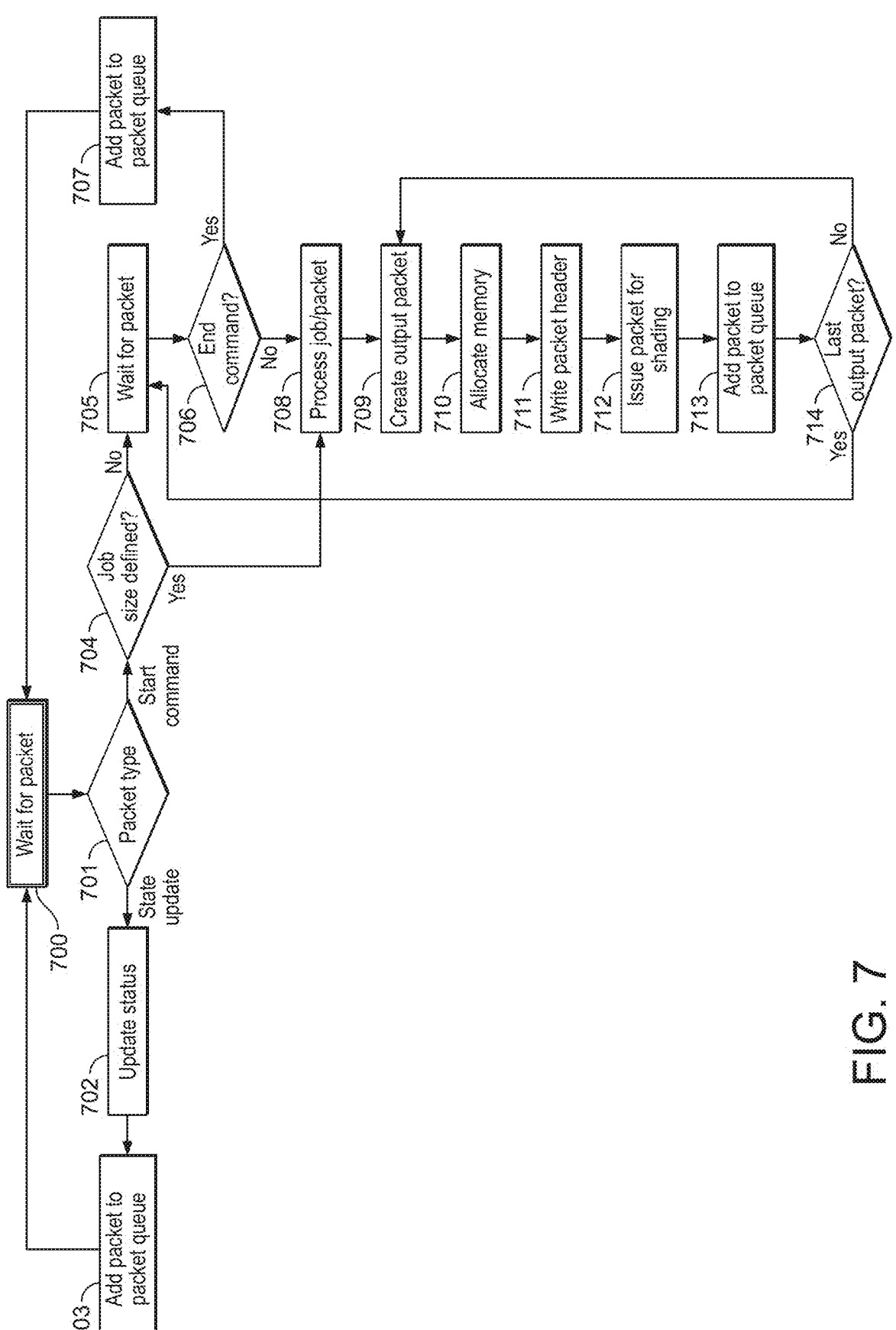
FIG. 7 is a flow chart illustrating the "frontend" processing operations within a generic shader stage circuit according to an embodiment.

FIG. 7 is a flow chart showing the shader stage frontend operation that may be performed by a shader stage in more detail. As shown in FIG. 7, packets of work items to be processed and packets of state are both passed through the pipeline stages in a similar manner. Thus, the shader stage frontend waits for a new packet to be received (step 700), and then determines whether packet includes a packet of work items to be processed or whether the packet includes a state update (step 701). For state updates, the relevant state is updated (step 702), and the packet is then added to the packet queue (step 703) so that the state update can be passed on to the next pipeline stage. This then allows state updates can be propagated through the pipeline stages to allow the graphics processing pipeline to be appropriately updated/re-configured for different instances of graphics processing pipeline execution.

For packets of work items, the shader stage frontend first checks whether the job size is defined (step 704), i.e. whether the shader stage has the information needed to process the packet of work items. If not (step 704—no), the shader stage frontend may wait for further packets for the current job (step 705). If a packet containing a suitable 'end command' indicating that the current job is finished (i.e. all packets for all draw calls for that job have been processed) is received (step 706—yes), the packet can be added to the packet queue (step 707) so that the 'end command' can be passed on to the next pipeline stage. Otherwise, once the job size is defined (step 704—yes), or so long as an 'end command' is not received such that there are further packets to be processed for the current job (step 706—no), the shader stage frontend then proceeds with processing further packets for the current job (step 708). The packet processing in the shader stage frontend is performed as follows.

Firstly, the shader stage frontend determines from the packet header (i.e. including the packet metadata) how many (if any) output packets should be generated from the incoming packet, and creates a corresponding (first) output packet (step 709).

The output packet is then processed by the shader stage frontend messaging the memory management system to allocate a respective portion of the memory pool tied to the current pipeline stage (step 710), and writing the respective packet header to that portion of the memory pool (step 711). The packet is then issued for shading (step 712) and added to the packet queue for the current pipeline stage (step 713). In particular, when a packet is issued for shading (i.e. at step 712) this is done by issuing a suitable shading request via the generic shading interface 47 which shading request should indicate to the set of shader cores the respective shader program(s) (if any) to be executed for the packet in question as well as the memory location(s) for the input/output packets for which the shading is to be performed.

This is then repeated until all of the desired output packets have been created and added to the packet queue (i.e. following the 'step 714—no' loop).

Once all of the output packets created from a respective incoming packet have been processed in this way (step 714—yes), the shader stage frontend then waits for the next incoming packet (step 705) from the current job, which is then processed in the same way. Once all of the packets for the current job have been processed (i.e. the 'end command' is received (step 706)), the job is finished and the shader stage frontend waits for the next packet (step 700) (i.e. for a next job).

Thus, the shader stage frontend is configured to issue packets for shading (i.e. step 712) and maintain a respective packet queue including the packets that are currently being processed by the shader stage in question.

Figure 8:
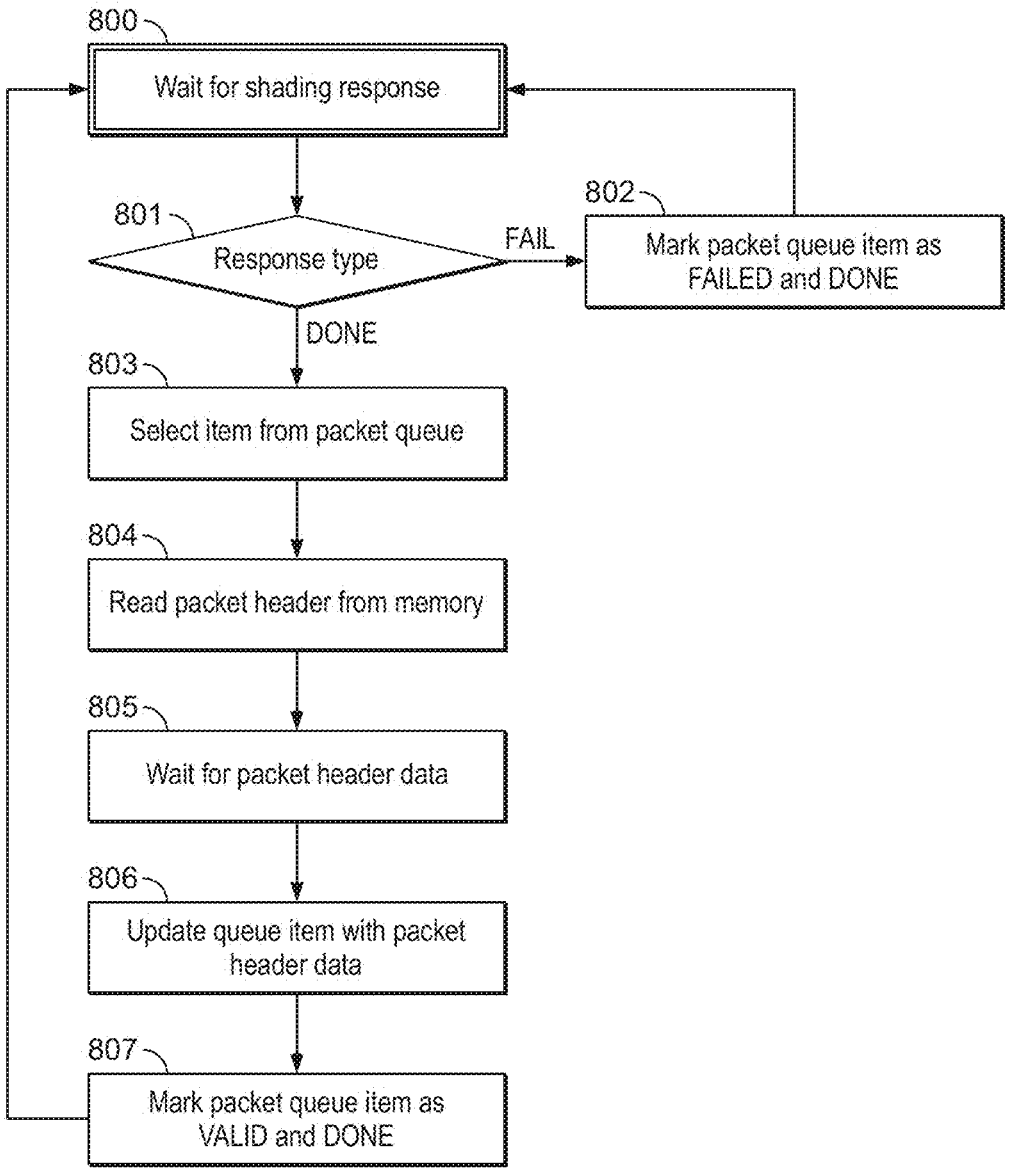
FIG. 8 is a flow chart illustrating the management of a packet queue within a generic shader stage circuit according to an embodiment.

FIG. 8 is a flow chart showing how packets are updated in the packet queue. Note that this process is asynchronous to the shader stage frontend operations. Thus, the shading of packets may complete out of order, but the packets are nonetheless kept in order in the packet queue (and provided in this same order for output to a next pipeline stage).

Thus, as shown in FIG. 8, after a packet has been issued for shading, the pipeline stage should then wait for a shading response to be received (step 800). If the response is that the shading has failed (step 801—fail), that packet is marked in the packet queue as having failed, and the processing of that packet by the current shader stage is accordingly done (step 802).

On the other hand, when the shading response indicates that the requested shading has been performed (step 801—done), the corresponding item for the packet in question is then selected from the packet queue (step 803), the packet header for that item is then read in from memory (step 804), and once the packet header data has been read in step (step 805), the queue item is updated with the packet header data (step 806) (e.g. based on the result of the shading). The packet queue item is then marked as valid and the processing of that packet by the current shader stage is accordingly done (step 807).

As shown in FIG. 8, each packet queue item is thus processed in the same way. Completed packets are thus queued in the packet queue for output to the next shader stage in the geometry packet pipeline 82.

The next shader stage in the geometry packet pipeline 82 thus receives the shaded packets from the packet queue of the preceding shader stage and the shaded packets are then treated as the incoming packets to that next shader stage (and are thus processed as shown in FIG. 7).

As shown in FIG. 7, a given shader stage can thus receive incoming packets from a preceding shade stage in the pipeline, allocate corresponding output packets based on the incoming packet, process the incoming/output packets as desired (including handling any amplification and issuing shading requests, etc.). Any metadata resulting from the processing of the incoming/output packets can then be written to the respective packet header in the allocated memory pool portion for the packet and the packet is then propagated to the next stage in the geometry packet pipeline 82.

It will be appreciated that a subsequent shader stage when processing a given (child) packet may also need to use the output data that was generated by the processing of a corresponding (parent) packet in an earlier pipeline stage. Thus, data for packets may need to remain in its respective allocated memory pool portion until all subsequent shader stages that may need that data have finished processing of any corresponding child packets that may need that data. Packets can thus be de-allocated in the last stage of the geometry packet pipeline 82 that needs data for those packets. The packet de-allocation is in an embodiment performed by the shader stage backend.

Figure 9:
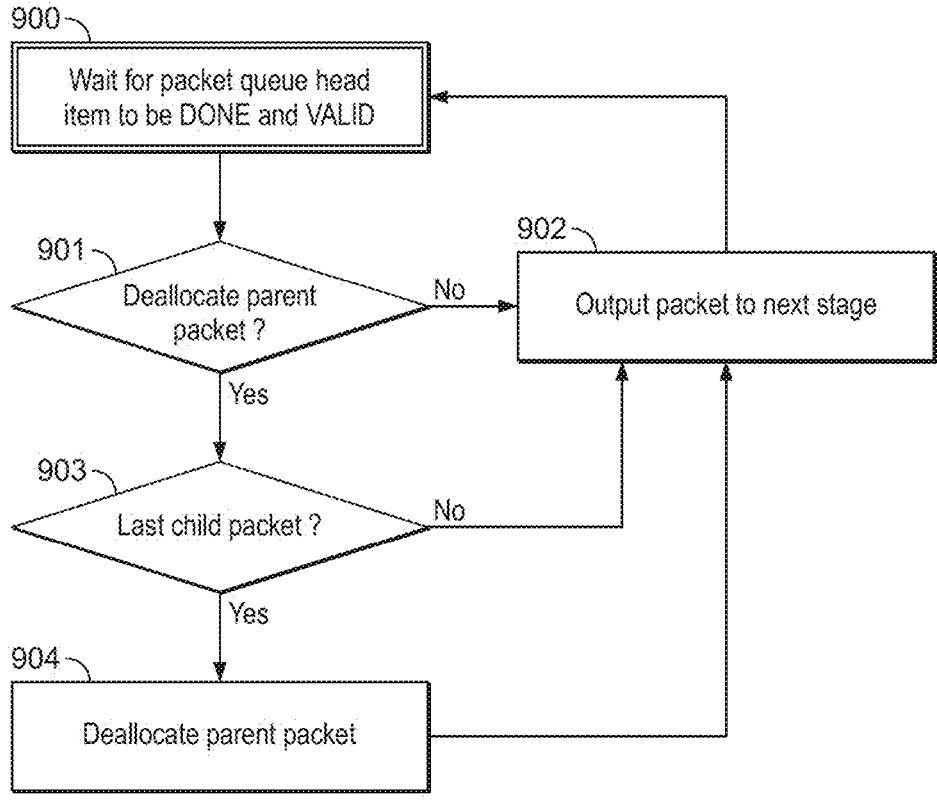
FIG. 9 is a flow chart illustrating the "backend" processing operations within a generic shader stage circuit according to an embodiment.

FIG. 9 is a flow chart showing the shader stage backend operation in more detail. As shown in FIG. 9, the shader stage backend waits for the packet at the head of the packet queue to be done and valid (i.e. step 807 in FIG. 8). Before pushing the packet to the next shader stage (step 902), the shader stage backend checks whether the current shader stage should deallocate a respective parent (or grandparent, etc.) packet of the packet that is currently being processed (step 901). This will be determined based on whether the current shader stage is the last shader stage that potentially needs access to the data stored for that parent packet. If not (step 901—no), the packet is output to the next stage (step 902), and the next packet at the head of the packet queue is processed in the same way.

Whereas, if the current shader stage should trigger deallocation of the parent packet (step 901—yes), it is then checked whether the current packet is the last child (grandchild, etc.) of the parent packet that is to be deallocated. If not (step 903—no), the packet is output to the next stage (step 902), and the next packet at the head of the packet queue (which in this case should be another child (grandchild, etc.) of the same parent packet) is processed in the same way. Once the last child (grandchild, etc.) of the parent packet that is to be allocated has been processed (step 903—yes), the shader stage backend can thus trigger invalidation of the parent packet so that its respective memory pool allocation can be deallocated (step 904).

This is done in the present embodiments by the shader stage backend messaging the memory manager 70 to trigger deallocation of the respective memory pool portion that was previously allocated for that parent packet.

The memory allocation and deallocation will be described in more detail with respect to FIG. 10. For example, as shown in FIG. 3 (and FIG. 4), the geometry packet pipeline 42 also has a shared memory manager 70 which manages the memory allocations and deallocations for temporary packet data for each of the pipeline stages (e.g. as described above).

Figure 10:
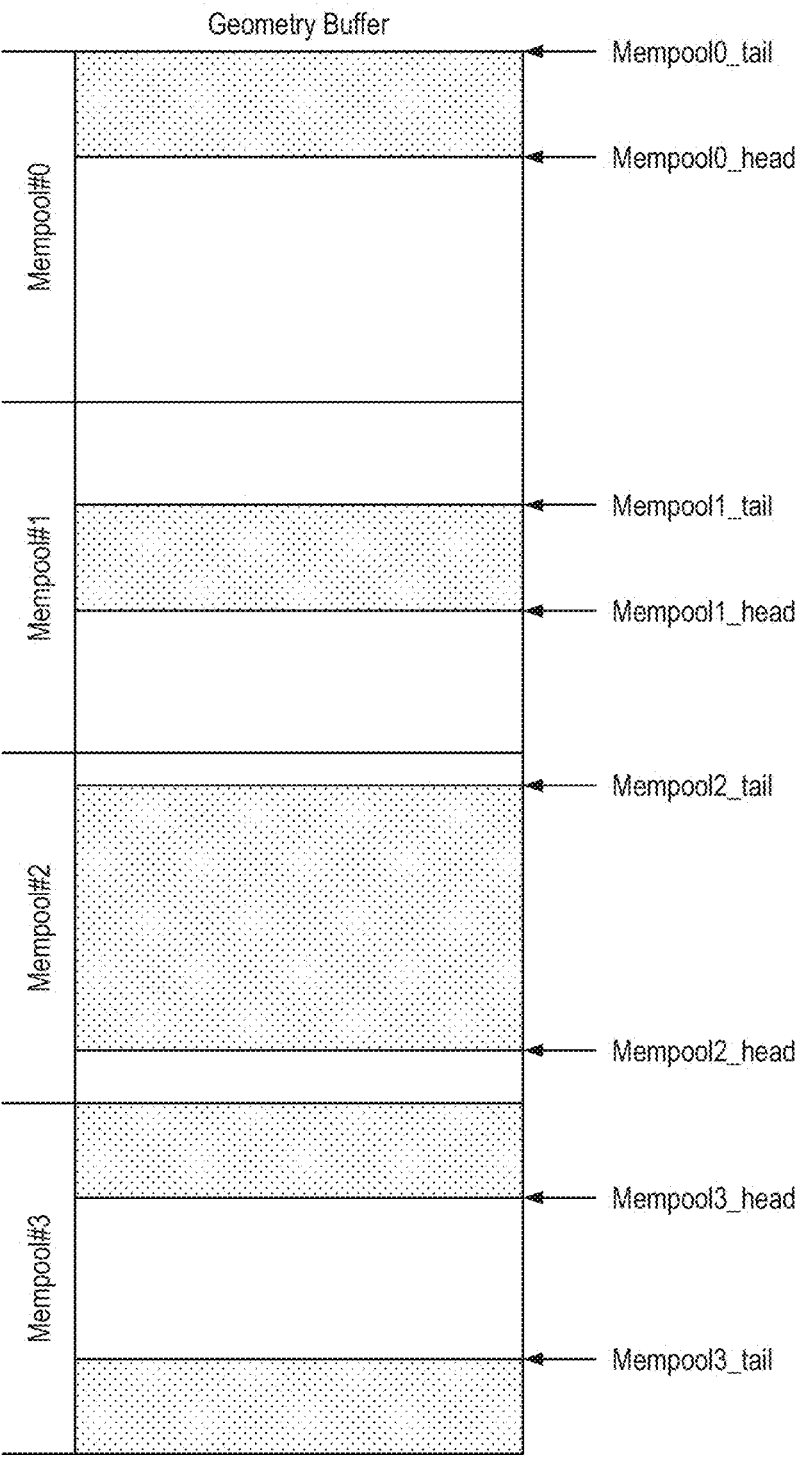
FIG. 10 shows schematically the layout of a geometry buffer according to an embodiment.

In this respect, as shown in FIG. 10, each shader stage circuit 44, 45, 46 is assigned its own memory pool for storing its respective data. In the present embodiments, as shown in FIG. 10, the memory pools reside in a defined overall geometry buffer for the geometry packet pipeline 42 that is portioned into multiple contiguous memory pools for use by the respective pipeline stages. Various arrangements would of course be possible in this regard and the geometry buffer may reside in any suitable and desired memory.

FIG. 10 thus shows schematically the layout of the geometry buffer in the present embodiments. As shown in FIG. 10, the geometry buffer contains several memory pools (implementation defined). For example, in FIG. 10, four memory pools are defined (Mempool #0, Mempool #1, Mempool #2, Mempool #3) for the six shader stages shown in FIG. 5 but other arrangements would of course be possible. In general, the memory pools can have different size but in the example shown in FIG. 10 each memory pool has the same size. As shown in FIG. 10, each memory pool has a respective pair of head and tail pointers, where the head pointer points to the address for the next allocation and tail pointer points to the address for the next deallocation.

Since allocations and deallocations in the memory pool always happen in order, this then avoids any need to track individual allocations. When allocations reach the end of a memory pool, the pointer moves to the beginning of the memory pool. As described above, allocated portions of the memory pool should thus be de-allocated to free memory in the memory pool for future packet allocations (and this memory de-allocation is done as described above in relation to FIG. 9).

For each memory pool, a respective memory pool access bit mask is generated during the initial pipeline configuration to indicate which pipeline stages access the memory pool. For example, the first shader stage accessing a given memory pool always allocates packets to that memory pool (and so the respective bit for that shader stage should be set accordingly in the memory pool access bit mask for that memory pool to indicate that it is the first shader stage accessing that memory pool). The last shader stage accessing a given memory pool (and for which a bit is set in the memory pool access bit mask for that memory pool) is then operable to trigger de-allocation of packets for that memory pool. Any intermediate shader stages can only access the memory pool, e.g. by reading and/or writing an already allocated packet (but cannot perform any memory allocations/de-allocations).

Thus, for any shader stage to access a given memory pool, the memory pool configuration should set a corresponding bit in the memory pool access mask, and memory pool access mask defines the access permissions to the memory pool in question.

In this respect, in the present embodiments, any shader stage, except the packet primitive drain unit can depending on the particular configuration of the shader stage make requests to the memory manager to allocate packets, but a stage can only allocate packets in the memory pool designated for this stage for the current instance of executing the graphics processing pipeline 42 (note that the access permissions may be re-configured between instances of executing the graphics processing pipeline 42. Similarly, all stages, except the input packetizer 43 can depending on the particular configuration of the shader stage request from the memory manager to deallocate one or multiple parent packets (with the deallocation of a parent packet being triggered by the last shader stage that potentially needs data for that parent packet).

This means there a given stage can only allocate in the memory pool assigned to that stage (i.e. a memory pool cannot be shared by multiple stages for allocations). Because all packet payloads allocated by a given stage will be allocated in the same memory pool, this means that all packets should therefore share the same size (at least for the current instance of graphics processing pipeline 42 execution).

Thus, as described above, and as shown in FIG. 7, in the geometry packet pipeline 42, packets get allocated by the memory manager 70, when a shader stage in the geometry packet pipeline 42 requests it. Once allocated a respective portion of the designated memory pool, the packet can be issued for shading. Each stage in the geometry packet pipeline 42 contains an internal packet queue which buffers and tracks allocated packets payloads. The packet queue is operated in a 'first-in-first-out' manner so that packets are kept strictly in the order the associated packet payloads were allocated.

As shown in FIG. 8, when the shade done message for a shaded packet comes back to the shader stage which issued the request, the corresponding packet item in the packet queue for that packet is marked as complete. The shader will typically write some packet metadata to memory (i.e. a result of the packet shading) and this may need to be sent back and communicated to the shader stage. The shader stage is thus operable to issue a suitable memory read to the packet payload and copy the contents of the packet header to the respective portion of the designated memory pool allocated for that packet.

As shown in FIG. 9, a completed packet at the front of the packet queue then gets pushed to the next stage in the geometry packet pipeline 42. The content of the packet is typically used in the frontend processing by the next shader stage to determine if/how it must expand the parent packet into multiple child packets and allocate new packet payloads based on parameters from the parent packet.

Packets accordingly flow down the geometry packet pipeline 82 in order from one pipeline stage to the next enabled pipeline stage, and so on, with each stage in the geometry packet pipeline 82 processing packets in the order the packets were allocated.

The geometry packet pipeline 82 may thus enforce certain waits to ensure that strict packet ordering requirements are enforced as packets pass down the geometry packet pipeline 82. For example, a given shader stage should stall when waiting for a shade done response for any packets being shaded. Similarly, a given shader stage should stall when the shader stage requests a memory allocation for a packet, but the memory allocation is stalled by the memory manager 70 (this may typically happen when there are outstanding allocation requests to the same memory pool or if the memory pool is full). Finally, the geometry packet pipeline 82 may stall waiting for fully processed packets to be drained from the last shader stage.

A specific example of the operation of a geometry packet pipeline according to an embodiment will now be described with reference to FIG. 11. In particular, in this example, task and mesh shaders are enabled, with FIG. 12 showing the operation of the task shader stage and FIG. 13 showing the operation of the following mesh shader stage.

Figure 11:
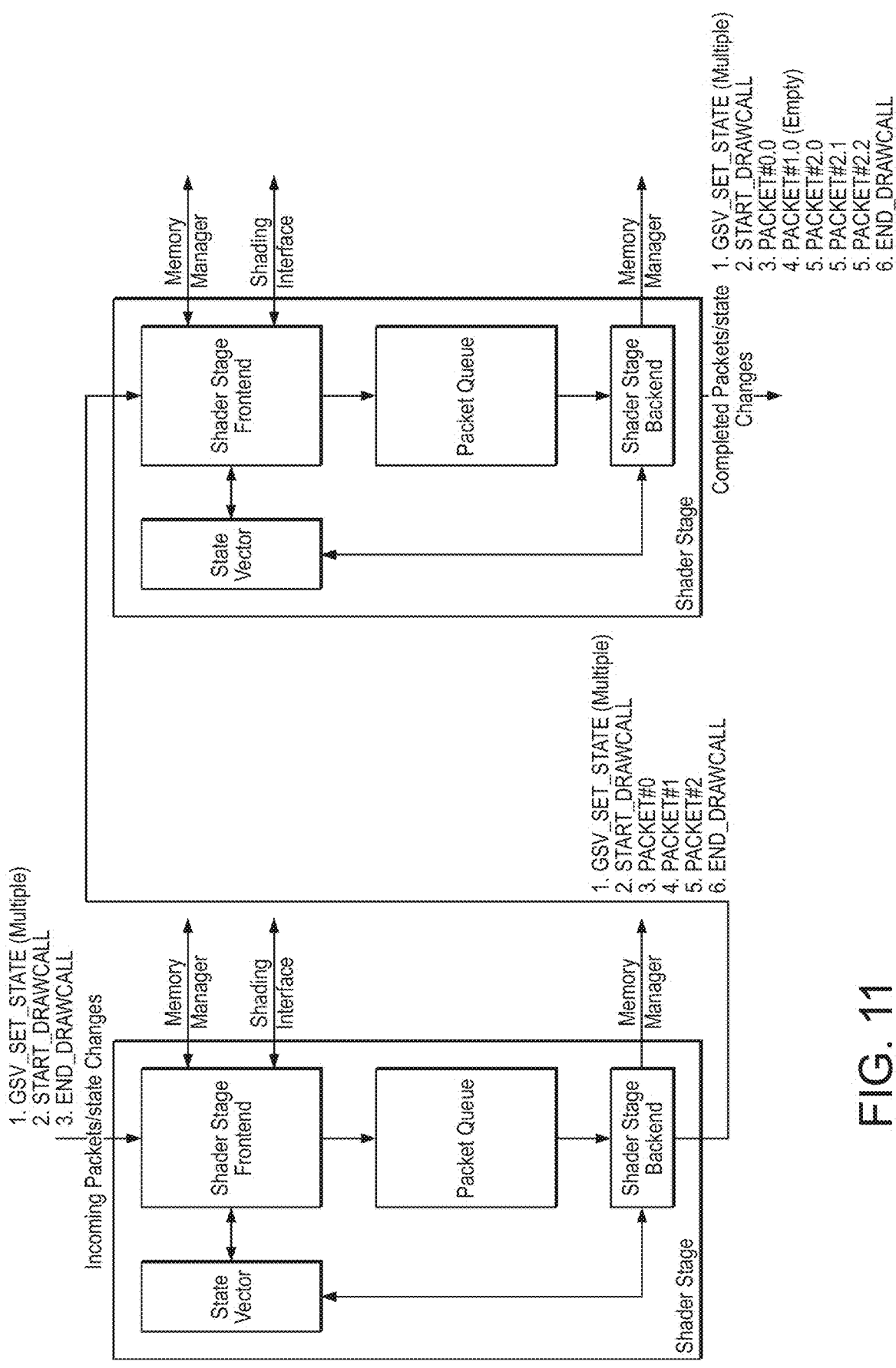

FIG. 11 thus shows schematically an example of the processing within the geometry packet pipeline 42 for a draw call with task and mesh shaders enabled.

FIG. 11 thus shows the commands and packets at the interfaces of the task and mesh shaders stages. As shown in FIG. 11, and as described above, commands are passed down through the frontend, packet queue and backend of each shader stage, and output to the next shader stage. For example, as described above, incoming packets are processed in the frontend, and new packets might be created as part of these frontend processing operations. These packets are then inserted between the respective pair of START_DRAWCALL and END_DRAWCALL commands defining the current draw call FIG. 12 shows in more detail the flow through the shader stage handling the task shader.

Figure 12:
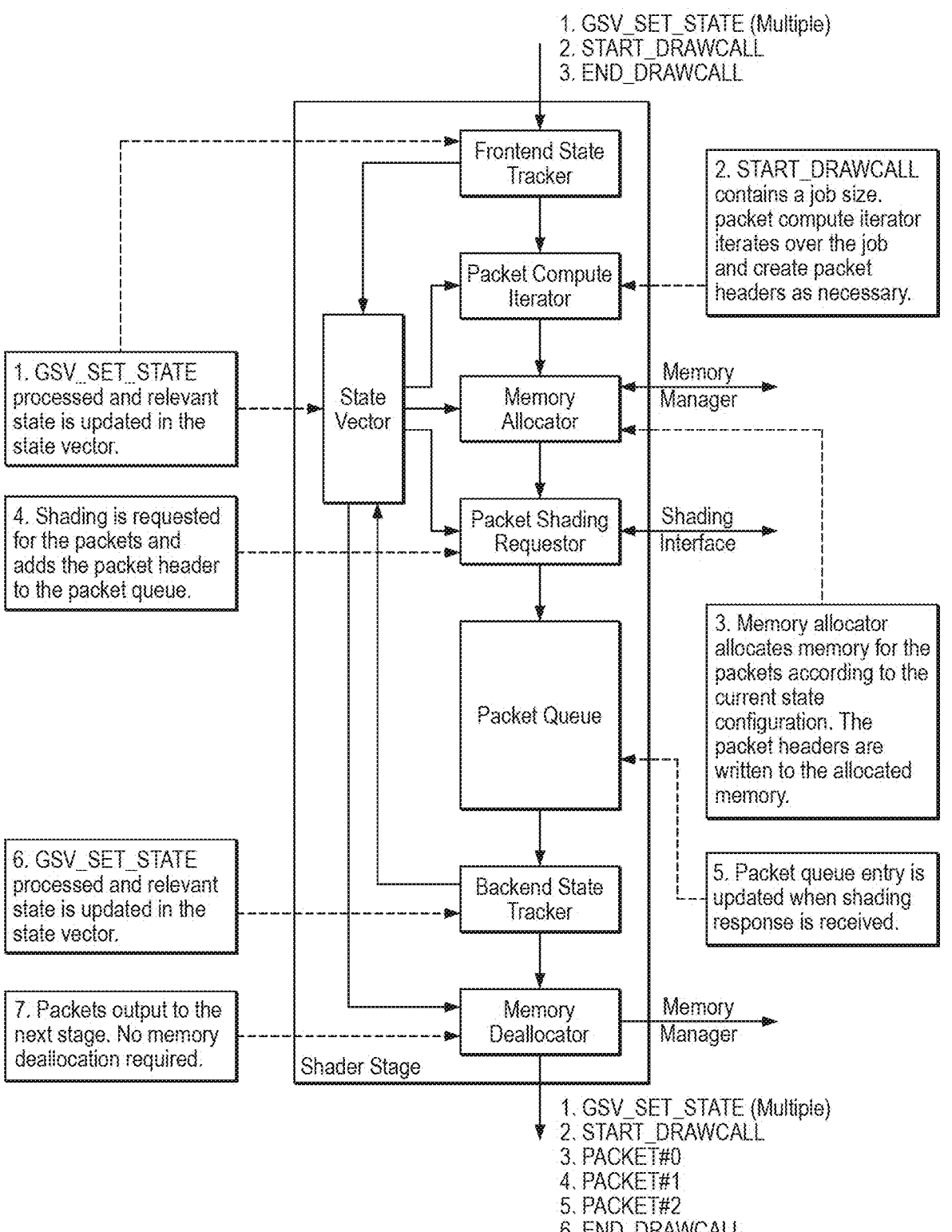

Thus, as shown in FIG. 12, the incoming commands starts with one or more commands to set state for the current draw call (a set of 'GSV_SET_STATE' commands). These GSV_SET_STATE commands are processed appropriately within a frontend state tracker circuit of the shader stage frontend and used to update any relevant state in the state vector stored for that shader stage.

The START_DRAWCALL command defines a job size and the job is iterated over by a packet compute iterator of the shader stage frontend to create corresponding output packets (headers) as necessary. In this example, there are three invocations of the task shader. The first task shader outputs mesh invocation count=(1,1,1). The second outputs mesh invocation count=(0,0,0). The last outputs mesh invocation count=(1,1,2).

For each output packet created for the job, a memory allocator of the shader stage frontend then allocates a respective portion of the designated memory pool for the shader stage in question, and writes the packet (headers) to the allocated memory. Shading is then requested for the packets and the packets are added to the packet queue which is then updated as described above when shading responses are received.

The GSV_SET_STATE commands when reaching the shader stage backend can also trigger updates of the state vector.

The packets are then output to the mesh shader stage. FIG. 13 shows in more detail the flow through the shader stage handling the mesh shader. The mesh shading is then performed as shown in FIG. 13 (and as described above).

In this example, the main difference between task and mesh shading is that a job size is defined for the shader stage handling the task shader. This means that the task shader does not receive any incoming packets, but instead generates packets according to the defined job size. Whereas, the shader stage handling the mesh shader does not have a job size defined for the draw call but will instead receive a job size from the incoming packets.

Each incoming packet can define a different job size. This can be specified, for example, in the packet metadata (headers), which can indicate the number of child packets to invoke, etc.

Thus, in this example, the inputs to shader stage #0 (the task shader) are:

One or many commands to set the graphics state vector

A start of draw call command

An end of draw call command

Correspondingly, the inputs to shader stage #1 (the mesh shader) are:

The same commands as input to shader stage #0 for setting the graphics state vector The same start of draw call command The three packets output from the three invocations of the task shader The end of draw call command The outputs from shader stage #1 (the mesh shader) are thus:

The same commands as input to shader stage #0 for setting the graphics state vector The same start of draw call command The five output packets created in shader stage #1 (the mesh shader).

The end of draw call command

The outputs from shader stage #1 (the mesh shader) will then be provided in turn to the next enabled pipeline stage (see, e.g., FIG. 5), where the commands will be propagated through the pipeline stages, with additional packets being created/processed in each pipeline stage, as necessary, as part of the geometry packet pipeline 42 execution.

The geometry packet pipeline 42 is thus a new block of hardware within the graphics processor 2 that serves as a single entry point for the whole geometry flow, feeding the tiler or distributed binning cores, as appropriate.

As will be appreciated from the above, the geometry packet pipeline 42 enables programmable packet shading and configures a number of generic shader stage circuits. Thus, the geometry packet pipeline 42 may be implemented using one or more generic (in hardware) programmable shader stage circuits, with these shader stage circuits being configured in software to implement the desired logical stages of the geometry packet pipeline 42.

A further aspect of the technology described herein is thus the initial configuration (and subsequent re-configuration) of the geometry packet pipeline 42.

For example, the geometry packet pipeline 42 in the present embodiments is configured in software at render pass granularity before pushing any work (i.e. draw calls) into the geometry packet pipeline 42. The initial configuration is thus performed to map the logical stages in the geometry flow (e.g. vertex shading, geometry shading, task and mesh shading, tessellation, transform feedback, or any valid geometry flow combination) to one or multiple stages in the geometry packet pipeline 42.

The initial pipeline configuration in the present embodiments may thus involve any, and in embodiments all, of: (i) enabling one or multiple stages of the geometry packet pipeline; (ii) configurating a shader program descriptor for each enabled stage; (iii) configuring workgroup dimensions for each stage; (iv) configuring one or more memory pools and binding each memory pool to a unique stage responsible for allocating packets in the memory pool; (v) configuring a packet size and layout for each memory pool; and (vi) setting a memory pool access mask for each memory pool indicates which shader stages can access the memory pool (with the first stage accessing a given memory pool always being the stage to allocate portions of that memory pool and the last stage accessing the memory pool always being the state to de-allocate portions of that memory pool).

Once the geometry packet pipeline 42 is configured, processing work can then be issued to the geometry packet pipeline 42.

In the present embodiments, this is done by the graphics processor using a respective 'RUN_PIPELINE' command that can be included into a command stream for the graphics processor to trigger one or more instances of executing the geometry packet pipeline 42.

For example, a RUN_PIPELINE command may trigger execution of the geometry packet pipeline 42 for a set of one or more draw calls for which the same geometry packet pipeline 42 is to be executed.

Various arrangements would be possible in this regard.

The geometry packet pipeline 82 may also need to stall between instances of graphics processing pipeline execution, e.g., and in particular, when the re-configuration affects a memory pool that is currently in use. In that case, the geometry packet pipeline 82 should ensure that all packets are drained from the geometry packet pipeline 82 and de-allocated from the memory pool in question, such that all work for the previous instance of graphics processing pipeline execution is effectively flushed, before the memory pool is re-configured. This then helps ensure correct (safe) behaviour between different instances of geometry packet pipeline 82 execution.

The technology described herein, at least in embodiments, thus provides an improved graphics processor operation, in particular through the use of a configurable graphics processing pipeline that can be used to support various different graphics processing flows using a set of 'generic' shader stage circuits.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A graphics processor that is operable to execute a processing pipeline to generate an output, the graphics processor comprising:

a set of one or more shader cores, each shader core including a respective programmable execution unit for executing shader programs; and one or more processing circuits configured to execute a plurality of pipeline stages defining at least a part of the processing pipeline, wherein at least one pipeline stage of the plurality of pipeline stages is operable and configured to:

process an incoming packet of work items to determine from the incoming packet of work items a corresponding zero or more child packets of work items to be further processed within the pipeline stage; and for a child packet of work items to be further processed within the pipeline stage:

allocate, for the child packet of work items, a respective portion of memory; and issue the child packet of work items to the set of shader cores for processing, the set of shader cores processing the packet of work items.

2. The graphics processor of claim 1, wherein the memory that can be allocated for child packets of work items is portioned into a plurality of memory pools, each memory pool being associated with one or more pipeline stages.

3. The graphics processor of claim 1, wherein there are a plurality of memory pools available for use by the processing pipeline, and wherein for a particular instance of processing pipeline execution, access to the plurality of memory pools is configured such that one or more pipeline stages are permitted to access a given memory pool, but wherein only a single pipeline stage is permitted to allocate respective portions of any given memory pool.

4. The graphics processor of claim 1, wherein the graphics processor is further operable and configured to:

after a respective portion of memory has been allocated by a pipeline stage for storing data for a particular, first packet of work items:

determine whether there are any further packets of work items yet to be processed within any subsequent pipeline stages in the processing pipeline for which the processing of the further packets of work items potentially uses the data stored for the particular, first packet of work items; and when it is determined that there are no further packets of work items yet to be processed within any subsequent pipeline stages in the processing pipeline for which the processing of the further packets of work items potentially uses the data stored for the particular, first packet of work items:

deallocate the respective portion of memory that was allocated for storing data for the particular, first packet of work items.

5. The graphics processor of claim 1, wherein a pipeline stage of the plurality of pipeline stages is operable and configured to store respective identifiers for packets currently being processed within the pipeline stage.

6. The graphics processor of claim 5, wherein, when a respective portion of memory is allocated for a packet of work items by a pipeline stage, the pipeline stage stores an identifier for the packet, and wherein the processing of the packet of work items by the set of shader cores can update the packet identifier to indicate that the processing of the packet of work items for that pipeline stage has finished so that the packet can be provided for output.

7. The graphics processor of claim 5, wherein the pipeline stage is operable and configured to maintain a packet buffer for storing the respective identifiers for packets currently being processed within the pipeline stage, the packet buffer operated in such a manner such that packets are provided for output in the same order as which the packets are added to the packet buffer.

8. The graphics processor of claim 1, wherein the processing of a packet within a pipeline stage generates information usable by a next pipeline stage to determine a corresponding zero or more child packets of work items to be further processed within such next pipeline stage, such information being provided for output to such next pipeline stage together with the identifier for the packet.

9. The graphics processor of claim 1, wherein a pipeline stage is operable to send shading requests to the set of shader cores using a generic shading interface, the shading requests including information usable by the set of shader cores to determine the respective shader program or programs, if any, to be executed for the pipeline stage in question.

10. The graphics processor of claim 9, wherein an indication of a respective shader program or programs specified to be executed for a pipeline stage is stored as state information associated with, or accessible to, the pipeline stage in question, and wherein the pipeline stage when issuing a packet of work items to the graphics processor's set of shader cores for processing is configured to, when issuing a shading request to the graphics processor's set of shader cores, indicate to the graphics processor's set of shader cores the respective shader program or programs to be executed.

11. The graphics processor of claim 9, wherein a shading request from a pipeline stage also includes an identifier of a memory location for the packet of work items to be processed and optionally one or more further memory locations for other packets of work items that may be used for the processing.

12. A graphics processor that is operable to execute a processing pipeline to generate an output, the graphics processor comprising:

a set of one or more shader cores, each shader core including a respective programmable execution unit for executing shader programs; and one or more processing circuits configured to execute a plurality of pipeline stages defining at least a part of the processing pipeline, wherein at least one pipeline stage of the plurality of pipeline stages is operable and configured to:

issue, via a respective generic shading interface, shading requests to the set of shader cores for processing packets of work items, wherein a shading request that is issued to the set of shader cores in respect of a packet of work items includes information usable by the set of shader cores to determine the respective shader program or programs, if any, to be executed for the pipeline stage in question and an identifier of a memory location for the packet of work items to be processed.

13. The graphics processor of claim 1, wherein the plurality of pipeline stages defining the processing pipeline are configured to include one or more of the following geometry processing stages: a position shader; a vertex shader; a tessellation control shader; a task shader; a tessellation stage; a mesh shader; a tessellation evaluation shader; a geometry shader; and a transform feedback stage, optionally wherein the processing pipeline further includes an input packetizer stage that provides input packets for the processing pipeline and/or a final primitive draining stage that drains output packets from the processing pipeline.

14. A method of operating a graphics processor, the graphics processor comprising:

a set of one or more shader cores, each shader core including a respective programmable execution unit for executing shader programs; and one or more processing circuits configured to execute a plurality of pipeline stages defining at least a part of a processing pipeline, the plurality of pipeline stages including at least a first pipeline stage and a second pipeline stage to which packets are passed from the first pipeline stage, the method comprising:

receiving, at the first pipeline stage of the processing pipeline, an incoming packet of work items; and the first pipeline stage processing the incoming packet of items to determine from the incoming packet of work items at least one corresponding child packet of work items to be further processed within the pipeline stage;

the method further comprising:

for each child packet of work items to be further processed within the pipeline stage:

allocating, for the packet of work items, a respective portion of memory;

issuing the packet of work items to the set of shader cores for processing, the set of shader cores processing the packet of work items; and providing the processed packet of work items for output to the second pipeline stage in the processing pipeline.

15. The method of claim 14, wherein the memory that can be allocated for child packets of work items is portioned into a plurality of memory pools, each memory pool being associated with one or more pipeline stages.

16. The method of claim 14, wherein there are a plurality of memory pools available for use by the processing pipeline, and wherein for a particular instance of processing pipeline execution, access to the plurality of memory pools is configured such that one or more pipeline stages are permitted to access a given memory pool, but wherein only a single pipeline stage is permitted to allocate respective portions of any given memory pool.

17. The method of claim 14, wherein the graphics processor is further operable and configured to:

after a respective portion of memory has been allocated by the first pipeline stage for storing data for a particular, first packet of work items:

determine whether there are any further packets of work items yet to be processed within any subsequent pipeline stages in the processing pipeline for which the processing of the further packets of work items potentially uses the data stored for the particular, first packet of work items; and when it is determined that there are no further packets of work items yet to be processed within any subsequent pipeline stages in the processing pipeline for which the processing of the further packets of work items potentially uses the data stored for the particular, first packet of work items:

deallocate the respective portion of memory that was allocated for storing data for the particular, first packet of work items.

18. The method of claim 14, wherein the first and second pipeline stages of the plurality of pipeline stages are each operable and configured to store respective identifiers for packets currently being processed within the pipeline stage, wherein the first and second pipeline stages are each operable and configured to maintain a packet buffer for storing the respective identifiers for packets currently being processed within those pipeline stages, the packet buffer operated in such a manner such that packets are provided for output in the same order as which the packets are added to the packet buffer.

19. The method of claim 14, wherein the processing of a packet within the first pipeline stage generates information usable by the second pipeline stage to determine a corresponding zero or more child packets of work items to be further processed within the second pipeline stage, such information being provided for output to the second pipeline stage together with the identifier for the packet.

20. The method of claim 14, wherein each pipeline stage is operable to send shading requests to the set of shader cores using a generic shading interface, the shading requests including information usable by the set of shader cores to determine the respective shader program or programs, if any, to be executed for the pipeline stage in question, wherein the shading request also includes an identifier of a memory location for the packet of work items to be processed and optionally one or more further memory locations for other packets of work items that may be used for the processing.

* * * * *